(12) United States Patent
Kamachi et al.

(10) Patent No.: US 7,969,895 B2
(45) Date of Patent: Jun. 28, 2011

(54) SWITCH APPARATUS AND NETWORK SYSTEM

(75) Inventors: Kazunori Kamachi, Kashiwa (JP); Hiroyuki Dei, Samukawa (JP)

(73) Assignee: Alaxala Networks Corporation, Kanagawa (JP)

( * ) Notice: Subject to any disclaimer, the term of this patent is extended or adjusted under 35 U.S.C. 154(b) by 105 days.

(21) Appl. No.: 12/323,539

(22) Filed: Nov. 26, 2008

(65) Prior Publication Data

US 2009/0219821 A1  Sep. 3, 2009

(30) Foreign Application Priority Data

Feb. 29, 2008  (JP) .................................. 2008-049018

(51) Int. Cl.
G06F 11/30 (2006.01)
H04L 12/26 (2006.01)
(52) U.S. Cl. .................. 370/242; 370/249; 714/716
(58) Field of Classification Search .................. 370/242, 370/248–249, 217, 241, 216, 401; 714/716
See application file for complete search history.

(56) References Cited

U.S. PATENT DOCUMENTS

| | | | |
|---|---|---|---|
| 6,546,498 B1 * | 4/2003 | Saegusa | 714/4 |
| 7,200,108 B2 * | 4/2007 | Beer et al. | 370/222 |
| 7,230,926 B2 * | 6/2007 | Sutherland et al. | 370/241 |
| 7,545,750 B2 * | 6/2009 | Yasuie et al. | 370/242 |
| 7,855,971 B2 * | 12/2010 | Ito | 370/249 |
| 2002/0191537 A1 * | 12/2002 | Suenaga | 370/221 |
| 2003/0005352 A1 * | 1/2003 | Beer et al. | 714/4 |
| 2006/0013141 A1 * | 1/2006 | Mutoh et al. | 370/241 |
| 2006/0026471 A1 * | 2/2006 | Kubota et al. | 714/724 |
| 2006/0072460 A1 * | 4/2006 | Fukui et al. | 370/235 |
| 2006/0182036 A1 * | 8/2006 | Sasagawa et al. | 370/242 |
| 2007/0174724 A1 * | 7/2007 | Yasuie et al. | 714/43 |

FOREIGN PATENT DOCUMENTS

JP  2006-217496  8/2006

OTHER PUBLICATIONS

IEEE Standards 802.1D, "IEEE Standard for Local and metropolitan area networks", Jun. 9, 2004.

* cited by examiner

*Primary Examiner* — Kwang B Yao
*Assistant Examiner* — Candal Elpenord
(74) *Attorney, Agent, or Firm* — Mattingly & Malur, P.C.

(57) ABSTRACT

A switch apparatus providing with a loop detection function sets a port identification to a port which activates the loop detection function, only receives the loop detection frame by a high-order port in the switch apparatus connected with a backbone network or a high-order switch apparatus on the basis of the port identification set previously, and controls an inactivation of a sending source low-order port that sent the loop detection frame, when the loop detection frame is received by the high-order port.

1 Claim, 15 Drawing Sheets

—·—·— IMPROPER CONNECTION

FIG. 5

| PORT IDENTIFICATION \ OPERATION | SENDING OF LOOP DETECTION FRAME 501 | PORT INACTIVATION ON DETECTION 502 | OPERATIONAL LOG DISPLAY AND TRAP ISSUE ON DETECTION 503 | TRANSFER OF LOOP DETECTION FRAME 504 |
|---|---|---|---|---|
| DETECTION SENDING INACTIVATION PORT (Send Inactivate) | ○ | ○ *1 | ○ | × |
| DETECTION SENDING PORT (Send) | ○ | × | ○ | × |
| UPLINK PORT (Uplink) | × | ○ *1, *2 | ○ | × |

*1 : L2 LOOP DETECTION FRAME SENT FROM SWITCH APPARATUS ITSELF IS TARGET.
L2 LOOP DETECTION FRAME SENT FROM THE OTHER SWITCH APPARATUS IS FLOODED.

*2 : THAT HAS SENT LOOP DETECTION FRAME IS INACTIVATED.
UPLINK PORT IS NOT INACTIVATED.

SI : DETECTION SENDING INACTIVATION PORT (Send Inactivate)
S : DETECTION SENDING PORT (Send)
U : UPLINK PORT (Uplink)

FIG. 11

| | | CONNECTION DEVICE (A) | | |
|---|---|---|---|---|
| | | DETECTION SENDING INACTIVATION PORT (SI) | DETECTION SENDING PORT (S) | UPLINK PORT (U) |
| CONNECTION DEVICE (B) | DETECTION SENDING INACTIVATION PORT (SI) | (1) INACTIVATION (DEVICE A ON DETECTION) INACTIVATION (DEVICE B ON DETECTION) | (4) ONLY DETECTION (DEVICE A ON DETECTION) INACTIVATION (DEVICE B ON DETECTION) | (7) ONLY DETECTION (DEVICE A ON DETECTION) INACTIVATION (DEVICE B ON DETECTION) |
| | DETECTION SENDING PORT (S) | (2) INACTIVATION (DEVICE A ON DETECTION) ONLY DETECTION (DEVICE B ON DETECTION) | (5) NO CONNECTION *1 | (8) ONLY DETECTION (DEVICE A ON DETECTION) ONLY DETECTION (DEVICE B ON DETECTION) |
| | UPLINK PORT (U) | (3) INACTIVATION (DEVICE A ON DETECTION) ONLY DETECTION (DEVICE B ON DETECTION) | (6) ONLY DETECTION (DEVICE A ON DETECTION) ONLY DETECTION (DEVICE B ON DETECTION) | (9) ONLY DETECTION (DEVICE A ON DETECTION) ONLY DETECTION (DEVICE B ON DETECTION) |

*1: SINCE THE DETECTION SENDING PORT SENDS A L2 LOOP CONTROL FRAME INCLUDING L2 LOOP DETECTION PORT IDENTIFICATION INFORMATION FROM THE SWITCH APPARATUS ITSELF TO AN ADJACENT DEVICE (L2 LOOP DETECTION FUNCTION ACTIVATION DEVICE), WHEN A L2 LOOP FRAME SENT FROM THE DETECTION SENDING PORT OF THE OTHER SWITCH APPARATUS IS RECEIVED AT THE DETECTION SENDING PORT, THIS PORT IS BLOCKED AND NOT CONNECTED.

FIG. 14

1400 PORT INFORMATION TABLE

| 1401 PORT NUMBER | 1402 LOOP DETECTION PORT IDENTIFICATION | 1403 VLAN ID | 1404 FRAME SENDING TIME INTERVAL | 1405 NUMBER OF DETECTION TIMES (INACTIVATION THRESHOLD VALUE) | 1406 HOLD TIME PERIOD | 1407 AUTOMATICALLY RECOVERED TIME PERIOD |
|---|---|---|---|---|---|---|
| Port1 | U | 10 | 60 | 1 | 30 | 100 |
| Port2 | S | 5 | 5 | 100 | 60 | 120 |
| Port3 | SI | 30,40,50 | 30 | 50 | 10 | 60 |
| ---- | ---- | ---- | ---- | ---- | ---- | ---- |

SI : DETECTION SENDING INACTIVATION PORT (Send Inactivate)
S : DETECTION SENDING PORT (Send)
U : UPLINK PORT (Uplink)

FIG. 15

1500 CONTROL INFORMATION TABLE

| 1501 PORT NUMBER | 1502 PORT UP/DOWN INFORMATION | 1503 NUMBER OF DETECTION TIMES | 1504 HOLD TIMER | 1505 AUTOMATIC RECOVERED TIMER |
|---|---|---|---|---|
| Port1 | U | 0 | 0 | 0 |
| Port2 | U | 1 | 5 | 0 |
| Port3 | D | 50 | 5 | 50 |
| ---- | ---- | ---- | ---- | ---- |

U : PORT UP
D : PORT DOWN

SWITCH APPARATUS AND NETWORK SYSTEM

INCORPORATION BY REFERENCE

The present application claims priority from Japanese application JP 2008-049018 filed on Feb. 29, 2008, the content of which is hereby incorporated by reference into this application.

BACKGROUND OF THE INVENTION

The present invention relates to loop suppression control relative to switch apparatuses on a backbone network and a network constituted by other switch apparatuses arranged under the switch apparatuses on the backbone network, in this network environment.

The IEEE 802.1D standard discloses STP (Spanning Tree Protocol) and GSRP (Gigabit Switch Redundancy Protocol) as a loop suppression function on a network. Generally, the above loop suppression function is activated in switch apparatuses arranged on a backbone network. On the contrary, in the case of the switch apparatuses arranged below the backbone network, there is frequent occurrence such that a port is frequently installed for an additional purpose, and the switch apparatus is often installed for a temporary purpose. Therefore, in the case where STP is activated in the above installed switch apparatus, the loop suppression function, such as STP etc., is sometimes not activated in the switch apparatuses since the backbone network is subject to an adverse effect frequently caused by topology changes. In this environment, when a loop failure occurs at the switch apparatus arranged below the backbone network, a loop detection function is sometimes activated in the respective switch apparatuses arranged below the backbone network since the entire network is subject to the adverse effect. For example, in the case of JP-A-2006-217496, a technique as a current loop detection function has been designed such that a loop detection frame is sent from respective ports of a switch apparatus, and the switch apparatus itself receives the same loop detection frame to deactivate the port receiving the loop detection frame, or deactivate the port by performing a port priority control.

Of the above related art, the STP disclosed in IEEE 802.1D is activated in the switch apparatuses arranged on the backbone network, however, it is not activated in a network (hereinafter, referred to as low-order network) constituted by switch apparatuses arranged below the switch apparatuses of the backbone network. Because of the above situation, in the case where a failure occurs on the network, a constitution of the switch apparatuses is changed by causing a recovery, and a switch apparatus is additionally installed on the network, this takes about several tens of seconds until a communication is made stable in the case of STP. During that time period, there arises a problem that the communication between the switch apparatuses is halted on the backbone network.

Further, the current loop detection function disclosed in JP-A-2006-217496 is a technique such that the loop detection frame is sent from the respective ports of the switch apparatus itself, and the switch apparatus itself receives the same loop detection frame to deactivate the port that received the loop detection frame and to deactivate the port by performing the port priority control. However, in the case of the switch apparatuses arranged on the backbone network, there are no means of sending the loop detection frame to the backbone network since STP is activated to carry out loop suppression. This is because there is a suppression spreading effect for a low-order network when a loop occurs, in the case of the switch apparatus in which STP is activated. However, when a loop occurs in the low-order network, not only the port (hereinafter, referred to as low-order port) on a low-order network receives the loop detection frame, but also the port (hereinafter, referred to as high-order port) on the backbone network sometimes receives that the loop detection frame as well. In this case, the entire low-order network is decoupled from the backbone network since the high-order port that has received the loop detection frame is deactivated.

In the JP-A-2006-217496, even though it is attempted to set the high-order port to a high priority to carry out the port priority control, there arises a problem that the low-order network is decoupled from the backbone network since the high-order port is deactivated when the loop detection frame sent from the high-order port is received by the same high-order port.

SUMMARY OF THE INVENTION

An object of the invention is to provide a switch apparatus and a network system, including a loop detection function for detecting a loop occurrence without generating redundant traffic on a backbone network and for inactivating a port to suppress the loop, while a communication can be made preferably between the backbone network and a low-order network, in the case of the low-order network being arranged below the backbone network.

In order to achieve the above object, the switch apparatus of the invention sets a port identification for the port which activates the loop detection function. On the basis of the port identification, a high-order port in the switch apparatus connected with the backbone network and a high-order switch apparatus only receives a loop detection frame, but does not send this frame. A sending source low-order port that sent the loop detection frame is subject to an activation control when the high-order port receives the loop detection frame.

According to the invention, the port close to a place of loop occurrence is deactivated, so that an adverse effect of loop failure is not spread over the entire network.

The above objects as well as other objects, features and advantages of the invention will become apparent from the following description of the embodiments of the invention taken in conjunction with the accompanying drawings.

BRIEF DESCRIPTION OF THE DRAWINGS

FIG. 5 is an explanatory diagram showing a loop detection operation for every port identification in the embodiment;

FIG. 11 is a diagram showing a port connectivity between the switch apparatuses mounting with the loop detection function in the embodiment;

FIG. 14 is a diagram showing an example of a port information table; and

FIG. 15 is a diagram showing an example of a control information table.

DETAILED DESCRIPTION OF THE EMBODIMENTS

First, a general outline of the invention will be described with reference to the drawings.

Figure 1:
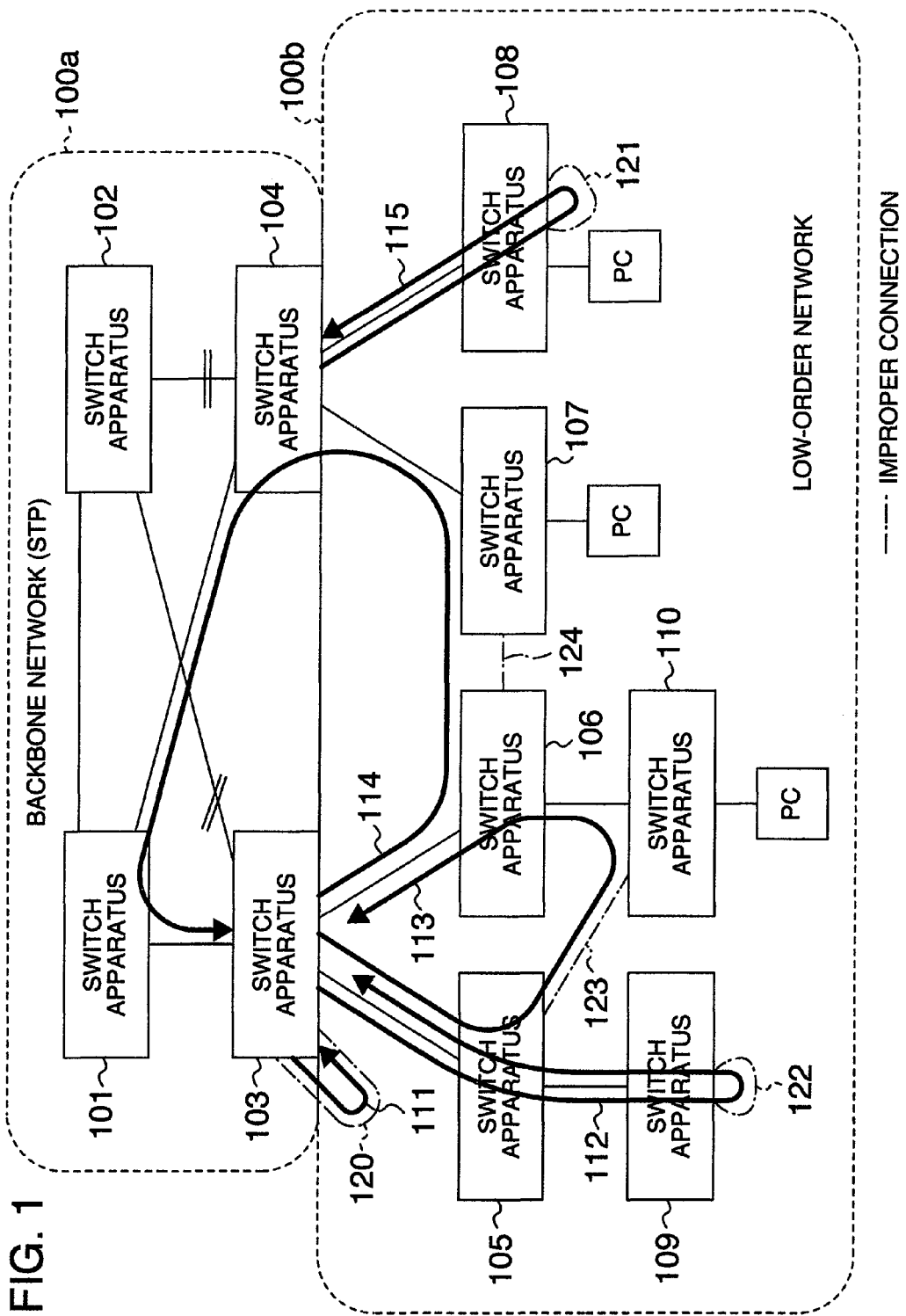
FIG. 1 is an example network constitution diagram showing the possibility of a loop occurrence.

FIG. 1 shows an example network constitution having a possibility for a loop occurrence. Loop suppression is carried out on a backbone network 100a including switch apparatus 101 to 104 by using STP (Spanning Tree Protocol) etc. However, when a loop occurs on a low-order network 100b, a frame which is looped up to the backbone network 100a is transferred, and an adverse effect of a loop failure is spread on the entire network. FIG. 1 indicates a pattern showing that a loop possibly occurs on the low-order network 100b. A loop pattern will be described on the basis of switch apparatuses 103, 104 in FIG. 1.

First, a loop failure 111 occurs when ports in the switch apparatus 103 are improperly connected with each other as indicated by an improper connection 120.

Next, when an improper connection 121 arises in a switch apparatus 108 arranged below the switch apparatus 104, a frame sent to the switch apparatus 108 from the switch apparatus 104 is sent to the switch apparatus 104 by the improper connection 121 caused by connecting one port with the other in the low-order switch apparatus 108. Consequently, a loop failure 115 occurs.

A loop failure 112 occurs when an improper connection 122 arises in a switch apparatus 109 arranged below a switch apparatus 105 also arranged below the switch apparatus 103.

A loop failure 113 occurs when an improper connection 123 arises in the switch apparatus 105 arranged below the switch apparatus 103 and in a switch apparatus 110 arranged below a switch apparatus 106 also arranged below the switch apparatus 103.

A loop failure 114 occurs by passing a frame sent from the switch apparatus 103 to the switch apparatus 106 through the switch apparatuses 106, 107 and 104 and also through the backbone network 100a, when an improper connection 124 arises between the switch apparatus 106 arranged below switch apparatus 103 and the switch apparatus 107 arranged below the switch apparatus 104 arranged differently on the backbone network 100a.

The above-mentioned loop failures cannot be prevented even though loop failure suppression is carried out by STP etc. activated on the backbone network. There has been a loop detection function to suppress the above-mentioned loop failures. However, the current loop detection function activates no matter what a range of the loop detection is extended to the backbone network or to the low-order network. The current loop detection operation is shown in FIG. 2 and FIG. 3.

Figure 2:
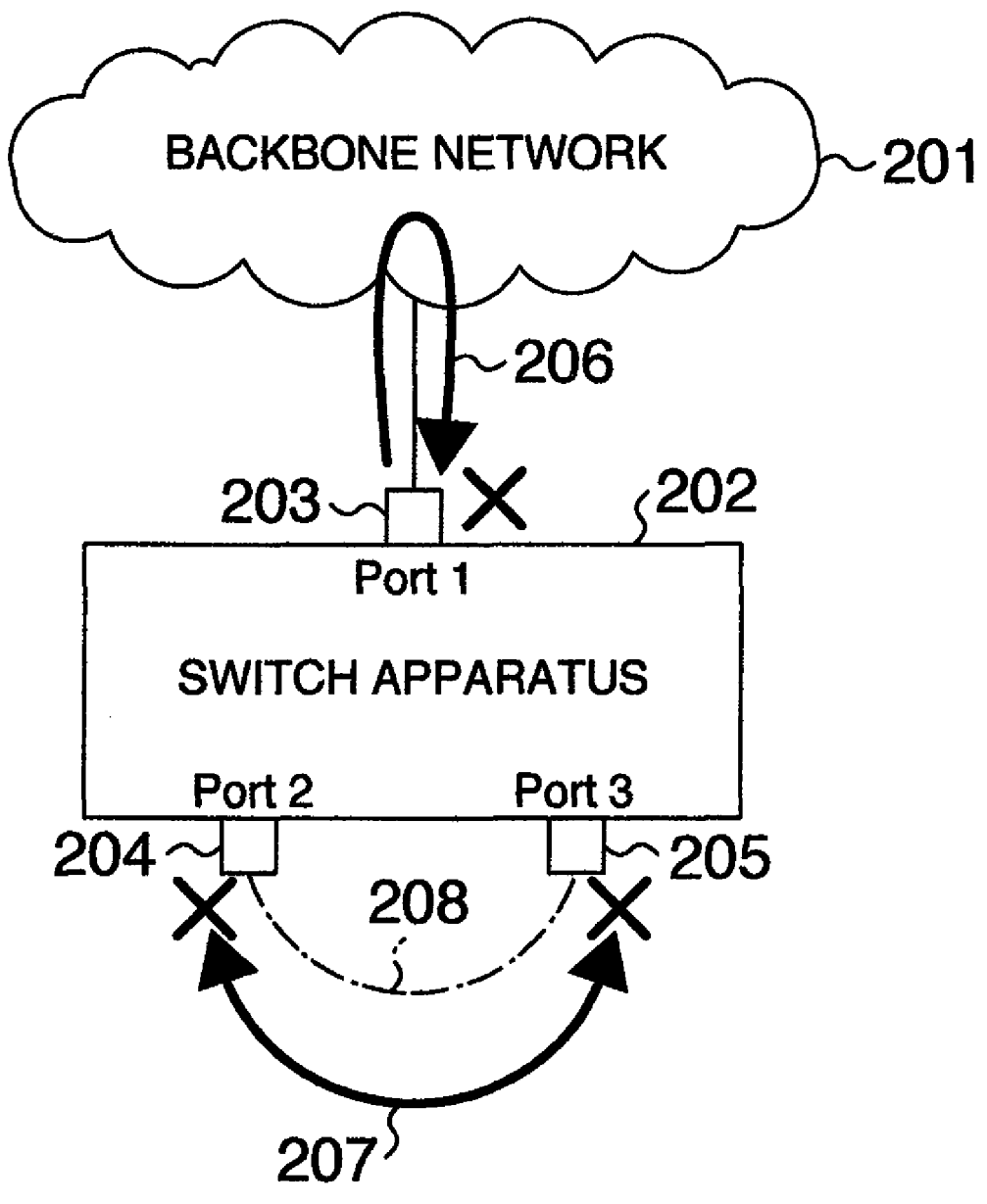
FIG. 2 is a diagram showing an operation example of a current loop detection function.

FIG. 2 is a diagram showing a basic example of the current loop detection function. A switch apparatus 202 is installed between the backbone network and the low-order network, as the switch 103 shown in FIG. 1. The switch apparatus 202 periodically sends an L2 control frame (hereinafter, a loop detection frame) 206, 207, for a purpose of a loop detection, from a designated port. The switch apparatus 202 then judges that a L2 loop occurs, and deactivates a reception port, when a port effective for the loop detection function receives the loop detection frames 206, 207. In this way, a failure (improper connection etc.) of causing a loop occurrence is decoupled from the network, so that an adverse effect of the failure is not spread on the entire network. When an improper connection 208 arises between a port 2 (204) and a port 3 (205) in the switch apparatus 202 in FIG. 2, the port 2 (204) and port 3 (205) are deactivated since the ports receive the respective loop detection frame. In addition, a port 1 (203) in the switch apparatus 202 is a high-order port connected with the backbone network 201, but this high-order port is deactivated, when the loop detection frame sent to a low-order network from a low-order port (not shown) in the switch apparatus 202 passes through the backbone network 100a, such as the loop failure 114 in FIG. 1, and is received by the high-order port 203. In this case, there arises a problem such that the switch apparatus arranged below the switch apparatus 202 cannot be communicated with the backbone network 201. Further, the loop detection frame 206 is sent to the backbone network 201 to thereby generate redundant traffic since the port 1 (203) in the switch apparatus 202 indicates that the loop detection function is effective.

Figure 3:
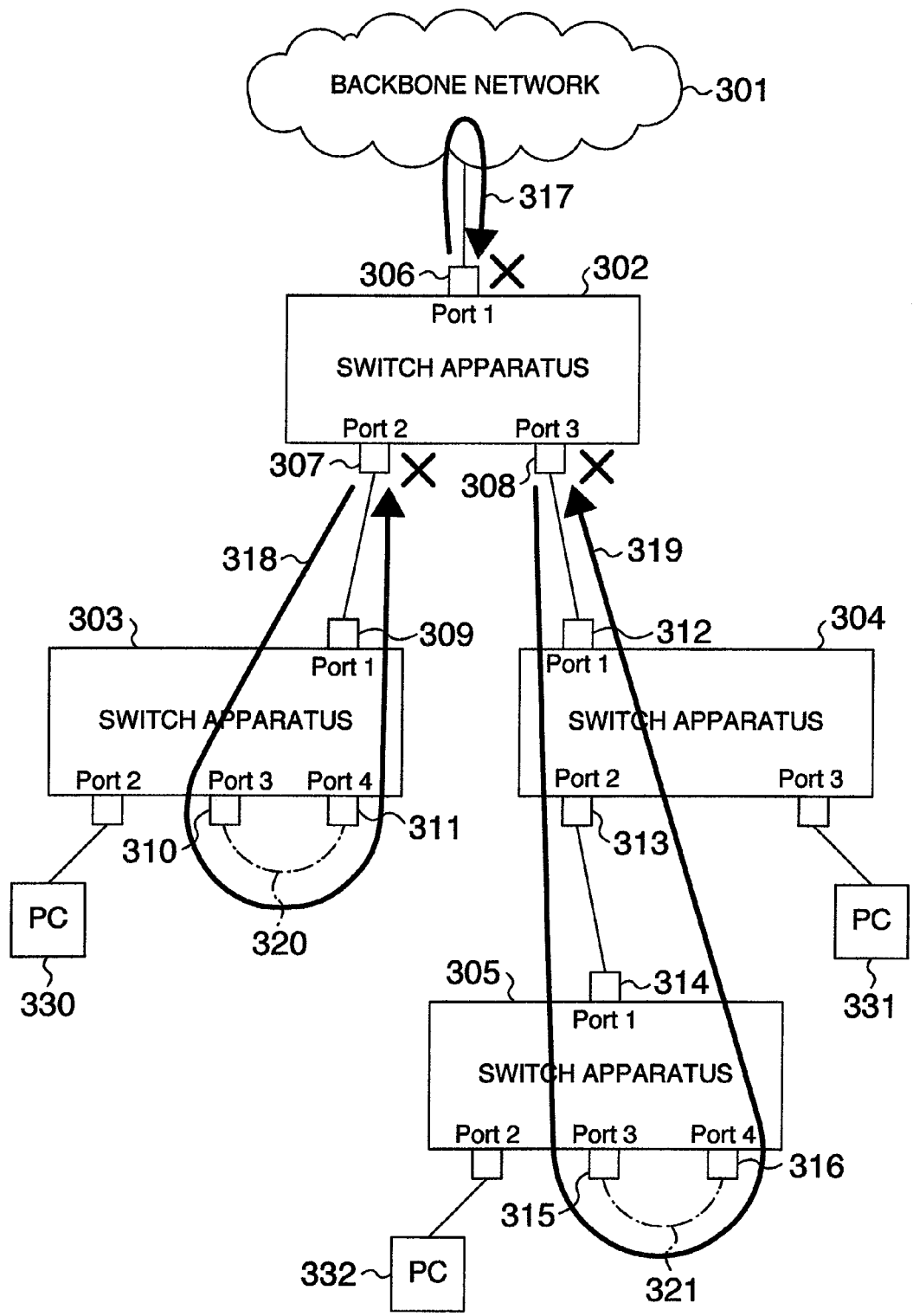
FIG. 3 is a network constitution diagram showing an operation example of a current loop detection function.

FIG. 3 is a current system diagram showing an operation of the loop detection function. Referring to FIG. 3, a switch apparatus 302 is installed between a backbone network 301 and its low-order network, as the switch apparatus 103 shown in FIG. 1, for example. The loop detection function is operated in the switch apparatus 302 to thereby send the loop detection frame from each port. In a switch apparatus 303 arranged below the switch apparatus 302, a loop failure occurs by causing an improper connection 320 between a port 3 (310) and a port 4 (311). In this case, a loop detection frame 318 sent from a port 2 (307) in the switch apparatus 302 is passed to the port 4 (311) through a port 1 (309) and the port 3 (310) in the switch apparatus 303 to then be received by the port 2 (307) in the switch apparatus 302. The switch apparatus 302 judges that a loop failure has occurred, and deactivates the port 2 (307) that received the loop detection frame 318. In this case, a problem arises such that a device (for example, PC (Personal Computer) 330) connected with the other port in the switch apparatus 303 cannot communicate with the backbone network 301.

Even when an improper connection 321 arises in the switch apparatus 305 arranged below the switch apparatus 304 also arranged below the switch apparatus 302, similar to the above mentioned, a loop detection frame 319 sent from a port 3 (308) in the switch apparatus 302 passes through a port 1 (312) and a port 2 (313) of a switch apparatus 304 and a port 1 (314), a port 3 (315) and a port 4 (316) of a switch apparatus 305 to then be received again by the port 3 (308) in the switch apparatus 302. For this reason, the switch apparatus 302 judges that a loop failure has occurred, and then deactivates the port 3 (308) that received the loop detection frame 310. In this way, the switch apparatuses 304, 305 arranged below the port 3 (308) in the switch apparatus 302 are decoupled from the network. However, devices (for example, PC 331 and PC 332) connected with the port 3 (308) in the switch apparatus 302, regardless of the loop failure, are also decoupled from the network. Therefore, a problem arises such that the devices cannot be communicated with the backbone network 301.

Next, a port 1 (306) in the switch apparatus 302 is a high-order port connected with the backbone network 301, but the high-order port 306 that received the loop detection frame is deactivated, when the loop detection frame sent to the low-order network from the low-order ports such as the port 2 (307) and port 3 (308) is received by the high-order port 306 through the backbone network 100*a*, such as the loop failure 114 in FIG. 1. In this case, a problem arises such that all of the switch apparatuses, including PCs, arranged below the switch apparatus 302 cannot communicate with the backbone network 301. Further, a loop detection frame 317 is sent to the backbone network 301 to thereby generate redundant traffic since the port 1 (306) in the switch apparatus 302 indicates that the loop detection function is effective.

Embodiments of the invention will be described with reference to the drawings to solve the above-mentioned problems that arise in the current loop detection function.

Figure 4:
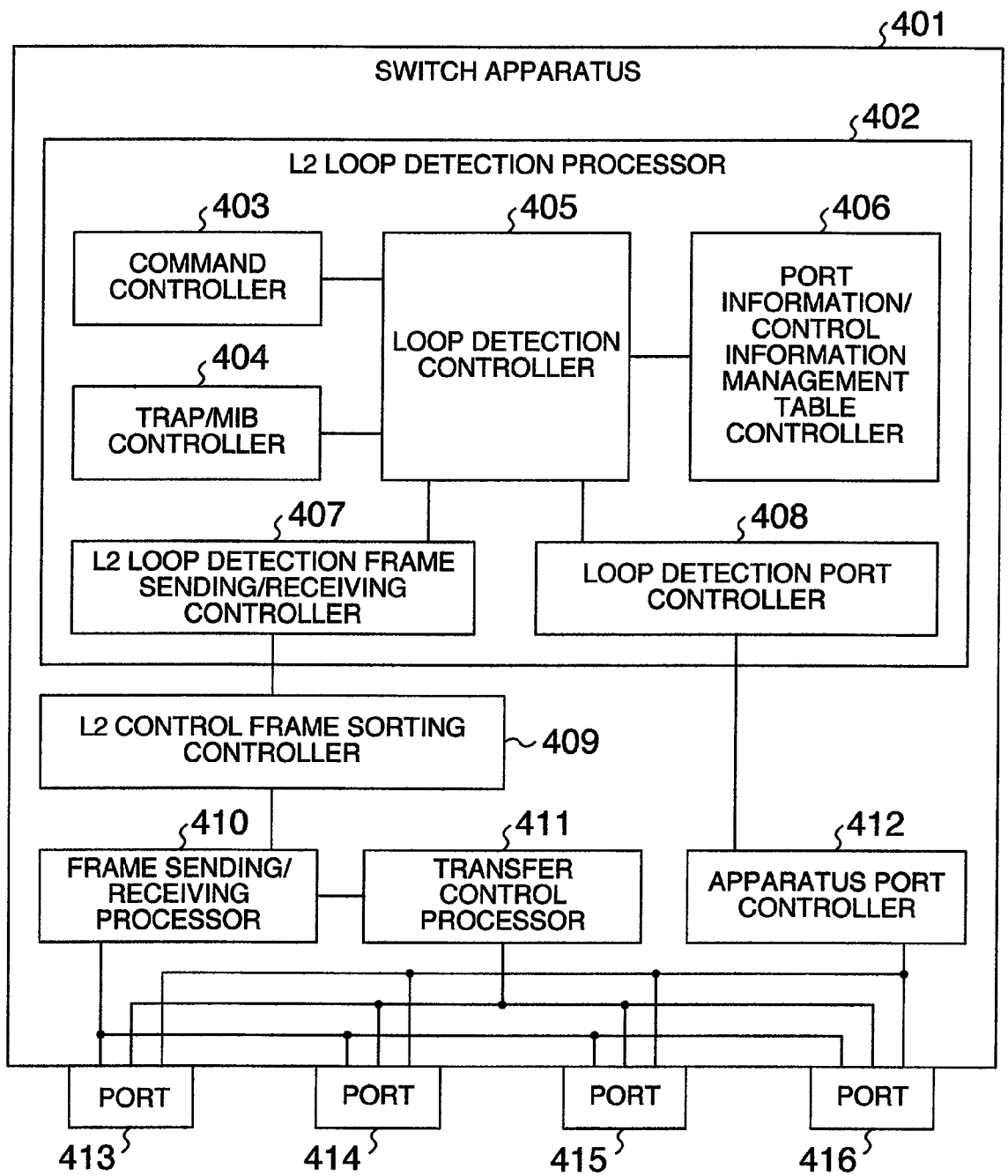
FIG. 4 is a constitution diagram of a switch apparatus provided with a loop detection function in an embodiment.

FIG. 4 is a diagram of the switch apparatus according to an embodiment of the present invention. A switch apparatus 401 has a plurality of physical ports 413 to 416. VLAN (Virtual Local Area Network) can also be defined such that the plurality of physical ports are handled as logical ports identified by a VLAN ID (identification). Frames received from these ports can also be transferred restrictedly to the other port in the same VLAN. A transfer control processor 411 receives frames via the ports 413 to 416 to then hold a transfer table for storing a correlation between a sending destination address and a sending port of a frame to be sent, by learning sending source address information and reception port information of the reception frame. The transfer control processor 411 then refers to the frame on a frame transfer, to send it to the sending port or discard it.

A frame sending/receiving processor 410 controls the frame to be sent or received by the switch apparatus 401. L2 control frames received by the respective ports are notified to an L2 control frame sorting controller 409 from the frame sending/receiving processor 410 to then be sorted into every L2 module.

When a loop detection frame is received from a port, this event is notified to an L2 loop detection frame sending/receiving controller 407 in an L2 loop detection processor 402. The L2 loop detection frame sending/receiving controller 407 handles all of sending/receiving frames to be processed in the L2 loop detection processor 402, and the loop detection frame is then notified to a loop detection controller 405. The loop detection controller 405 counts a number of times of receiving the loop detection frame for every port by using a control information table in a port information/control information management table controller 406. The loop detection controller 405 also judges that a loop has occurred when the same loop detection frame is received from the port by causing an excess time over a predetermined number of times within a predetermined time period, and then deactivates the port. When the port is deactivated, information of the port to be deactivated is notified to an apparatus port controller 412 via a loop detection port controller 408. The apparatus port controller 412 carries out a port control (activation/inactivation control etc.) for all of the physical ports in the switch apparatus 401.

A command controller 403 in the L2 loop detection processor 402 controls an initialization for a user relative to a loop detection processing and commands on an operation to then be notified to the loop detection controller 405. The loop detection controller 405 receives control information on the initialization and the operation to notify the control information to the port information/control information management table controller 406 and is stored therein.

Specifically, the port information/control information management table controller 406 creates a port information table 1400 shown in FIG. 14 from the information received from the loop detection controller 405. A record of the port information table 1400 is created for every port, and the record includes a port number 1401 of a port to operate the loop detection function, a loop detection port identification 1402 set in the port, a VLAN ID 1403 set in the port, a frame sending time interval 1404 indicating a sending time interval of the loop detection frame sent from the port, a number of detection times 1405 indicative of a threshold value indicating what a number of times of receiving the loop detection frame at the port is adapted to an inactivation for the port, a hold time period 1406 indicating by what a time the reception information of the loop detection frame is held, and an automatic recovered time period 1407 indicating what time the port is released automatically from the inactivation when the port is deactivated by the loop detection.

The port information/control information management table controller 406 further provides a control information table 1500 (FIG. 15) used for counting the number of times of receiving the loop detection frame and judging whether the port is deactivated, for a purpose of operating the loop detection function in the port. A record of the control information table 1500 is created for every port, and the record is constituted by a port number 1501 of the port which operates the loop detection function, up/down information 1502 indicating whether the port states a port-up or port-down condition, a number of detection times 1503 of counting and holding the number of times of receiving the loop detection frame, a hold timer 1504 for measuring and holding an elapsed time from receiving the loop detection frame, and an automatic recovered timer 1505 for measuring and holding an elapsed time from when the port is deactivated by the loop detection.

Figure 6:
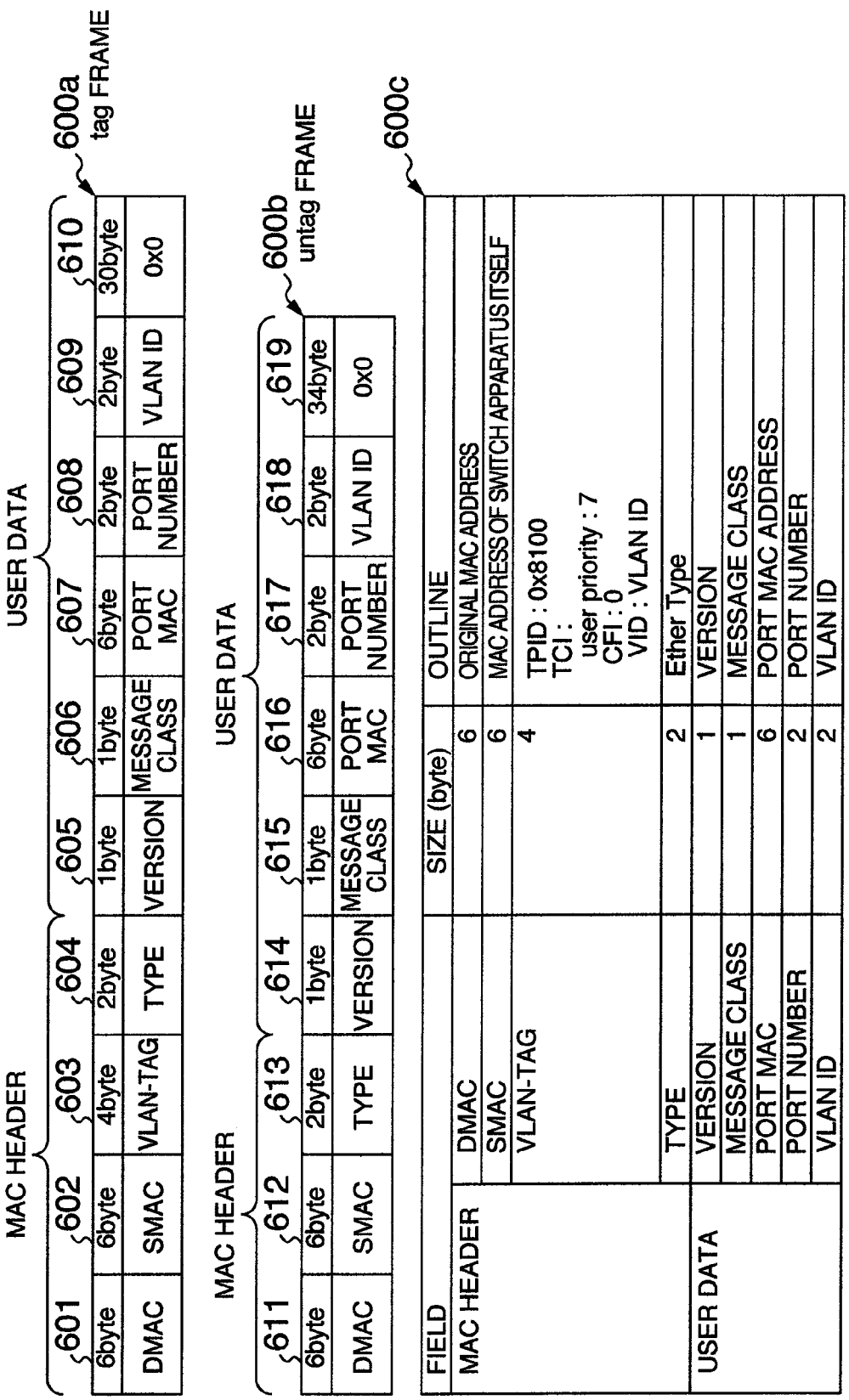
FIG. 6 is an explanatory diagram showing a format of a loop detection frame in the embodiment.

Here, FIG. 6 shows a format of the loop detection frame sent and received by the L2 loop detection processor 402. The loop detection frame may be used with either a tag frame 600*a* or an untag frame 600*b*. The tag frame 600*a* is made up of adding a VLAN TAG field 603 to the untag frame 600*b*. Contents of the respective fields of those are shown in a table 600*c*. The loop detection frame uses the L2 control frame, and a destination MAC (Media Access Control) address 601, 611 of a MAC header uses a previously reserved original MAC address. A sending source MAC address 602, 612 of the MAC header uses a MAC address of the switch apparatus itself. A type 604, 613 indicates the type of frame. Further, user data includes a version 605, 614 of the loop detection data, a message class 606, 615 indicating a class of whether the frame is a loop detection frame or a after-mentioned frame used for confirming an identification of a port connected for the loop detection, a port MAC 607, 616 indicating the MAC address of a sending source port from which the loop detection frame is sent, a port number 608, 617 of the sending source port from which the loop detection frame is sent, and a VLAN ID 609, 618. The rest of frame 610, 619 is padded with null (0x00).

A trap/MIB controller 404 controls to notify information to a user or a terminal device on the loop detection and on the inactivation for the port caused by the loop detection. For example, the user may refer to the information relative to the loop detection and port inactivation by writing it in MIB, and may control such that annunciation means, such as an LED, is provided on the port, and also provided on the terminal device connected with the switch apparatus 401, but any means are acceptable. The above-mentioned description has been concerned with the constitution of switch apparatus 401.

In the embodiment, a port identification is set in the port to operate the loop detection function in order to define a loop detection operation for every port. This port identification is the same as indicated by the loop detection port identification 1402 shown in FIG. 14.

FIG. 5 shows port identifications and those operations when the loop detection function is activated by the switch apparatus 401 in FIG. 4. The respective ports operate the loop detection as indicated by "○" in FIG. 5 determined on the basis of the port identification which is set previously. In response to the network environment where the switch apparatuses are equipped, three port identifications (detection sending inactivation port: SI, detection sending port: S, uplink port: U) in FIG. 5 can be set selectively in the respective ports of switch apparatus 401, so that the problems of the current techniques can be solved. Specific description will be stated below.

The port identification and its operation will be described with reference to FIG. 5.

A port set to "detection sending inactivation port" as the port identification will be described below. The detection sending inactivation port sends the loop detection frame (501). The port is deactivated when the detection sending inactivation port receives the loop detection frame sent from the switch apparatus itself, and when the detection sending inactivation port receives the loop detection frame in an excess time over a predetermined number of times within a predetermined time period (502). On the loop detection, a trap display due to the loop occurrence is applied to the control terminal device (503). The loop detection frame is not transferred to the other switch apparatus even though the detection sending inactivation port receives the loop detection frame sent from the switch apparatus itself (504). In addition, the loop detection frame is transferred (or flooded) when the other switch apparatus receives the loop detection frame.

An operation of the detection sending inactivation port will be described with reference to FIGS. 4, 6, 14 and 15.

It is assumed that the port 413 in the L2 switch apparatus 401 in FIG. 4 is set in the port information table 1400 as a port identification of "detection sending inactivation port." In this case, the port number 1401 and VLAN ID 1403 corresponding to a port number (for example, "port 3") of the port 413 are extracted from the port information table 1400 in the port information/control information management controller 406, when the loop detection function is effective at the port 413. The loop detection frame is created as described in FIG. 6, and sent to the VLAN ID 1403 (for example, VLAN 30, VLAN 40, VLAN 50 in the case of "port 3") at intervals of the frame sending time interval 1404 corresponding to the port number of port 413.

On the contrary, when the port 413 of the detection sending inactivation port receives the loop detection frame, the frame sending/receiving processor 410 judges whether the DMAC 601 in the loop detection frame is the same as the original MAC address and the SMAC 602 is the same as the MAC address of the switch apparatus itself. If it is judged that the both addresses are the same, the received loop detection frame and reception port information are sent to the L2 control frame sorting controller 409. If it is judged that the SMAC 602 is not the same as the MAC address of the switch apparatus itself, a flooding process is carried out for the loop detection frame received by the transfer control processor 411. The L2 control frame sorting controller 409 then confirms the DMAC 601 in the reception frame. The reception frame and reception port information are sent to the L2 loop detection frame sending/receiving controller 407 in the L2 loop detection processor 402, when it is confirmed that the original MAC address of DMAC 601 is the MAC address in the loop detection frame. The L2 loop detection frame sending/receiving controller 407 confirms the version 605 and message class 606 in the user data in the reception frame. If the L2 loop detection frame sending/receiving controller 407 confirms the loop detection frame, the reception frame and reception port information are sent to the loop detection controller 405.

The loop detection controller 405 refers to the reception port information received from the L2 loop detection frame sending/receiving controller 407 to confirm that the port 413 receives the loop detection frame. The loop detection controller 405 also refers to the loop detection port identification 1402 in the record corresponding to the port number (port 3) of port 413 from the port information table 1400 in the port information/control information management table controller 406 to confirm that the port 413 that received the loop detection frame is the detection sending inactivation port (SI). When the port identification of the port that received the loop detection frame is the detection sending inactivation port, the loop detection controller 405 carries out the operation as described below.

The loop detection controller 405 refers to the record indicating that the port number 1501 in the control information table 1500 is the port 3, and the number of detection times 1503 in the control information table 1500 is incremented by "1" if the hold timer 1504 does not exceed the hold time period 1406 corresponding to the port 3 in the port information table 1400. The number of detection times 1503 is set to "0" and incremented by "1" if the hold timer 1504 exceeds the hold time period 1406. The reception port (port 413, port 3) is deactivated if the number of detection times 1503, after incremented, equals the number of detection times 1405 indicative of the inactivation threshold value in the port information table 1400. The inactivation process means that the reception port number and a port inactivation command are sent to the loop detection port controller 408 from the loop detection controller 405. The loop detection port controller 408 sends the reception port number and port inactivation command to the apparatus port controller 412. The apparatus port controller 412 deactivates the port indicated by the command. Further, the loop detection controller 405 sets the port up/down information 1502 in control information table 1500 to U (port down), and sets the elapsed time, after deactivated the port is deactivated, in the automatic recovering timer 1505.

Next, the port with the port identification set to "detection sending port" will be described below. The detection sending port sends the loop detection frame (501). The port is not deactivated even though the detection sending port receives the loop detection frame sent from the switch apparatus itself (502). On the loop detection, a trap display due to the loop occurrence is applied to the control terminal device (503). The loop detection frame is not transferred to the other switch apparatus even though the detection sending port receives the loop detection frame sent from the switch apparatus itself (504). In addition, the loop detection frame is transferred (or flooded) when the detection sending port receives the loop detection frame sent by the other switch apparatus.

An operation of the detection sending port will be described with reference to FIGS. 4, 6, 14 and 15.

It is assumed that the port 414 in the L2 switch apparatus 401 in FIG. 4 is set in the port information table 1400 with a port identification of "detection sending port." In this case, the port number 1401 and VLAN ID 1403 corresponding to a port number (for example, "port 2") of the port 414 are extracted from the port information table 1400 in the port information/control information management controller 406, when the loop detection function is effective at the port 414. The loop detection frame is created as described in FIG. 6, and sent to the VLAN ID 1403 (for example, VLAN 5 in the case of "port 2") at intervals of the frame sending time interval 1404 corresponding to the port number of port 414.

On the contrary, when the port 414 of the detection sending port receives the loop detection frame, the frame sending/receiving processor 410 judges whether the DMAC 601 of the loop detection frame is the same as the original MAC address and the SMAC 602 is the same as the MAC address of the switch apparatus itself. If it is judged that the both addresses are the same, the received loop detection frame and reception port information are sent to the L2 control frame sorting controller 409. If it is judged that the SMAC 602 is not the same as the MAC address of the switch apparatus itself, the flooding process is carried out for the loop detection frame received by the transfer control processor 411. The L2 control frame sorting controller 409 then confirms the DMAC 601 in the reception frame. The reception frame and reception port information are sent to the L2 loop detection frame sending/receiving controller 407 in the L2 loop detection processor 402, when it is confirmed that the original MAC address of DMAC 601 is the MAC address of the loop detection frame. The L2 loop detection frame sending/receiving controller 407 confirms the version 605 and message class 606 in the user data of the reception frame. The L2 loop detection frame sending/receiving controller 407 then judges the loop detection frame to send the reception frame and reception port information to the loop detection controller 405.

The loop detection controller 405 refers to the reception port information received from the L2 loop detection frame sending/receiving controller 407 to confirm that the port 414 receives the loop detection frame. The loop detection controller 405 also refers to the loop detection port identification 1402 in the record corresponding to the port number (port 2) of the port 414 from the port information table 1400 in the port information/control information management table controller 406 to confirm that the port 414 that received the loop detection frame is the detection sending port (S). When the port identification of the port that received the loop detection frame is the detection sending port, the loop detection controller 405 carries out the operation as described below.

The loop detection controller 405 refers to the record indicating that the port number 1501 is the port 2 in the control information table 1500, and the number of detection times 1503 in the control information table 1500 is incremented by "1" if the hold timer 1504 does not exceed the hold time period 1406 corresponding to the port 2 in the port information table 1400. If the hold timer 1504 exceeds the hold time period 1406, the number of detection times 1503 is set to "0" and incremented by "1." It is judged that a loop failure has occurred if the number of detection times 1503, after incremented, equals the number of detection times 1405 indicative of the inactivation threshold value in the port information table 1400. However, the reception port (port 414, port 2) is not deactivated.

Next, a port set to the "uplink port" as the port identification will be described below. The uplink port does not send the loop detection frame (501). The inactivation process is carried out for the port that sent the loop detection frame, when the uplink port receives the loop detection frame sent from the switch apparatus itself (502). The port is deactivated if it receives the loop detection frame after an excess of a predetermined number of setting times for a predetermined setting time period. In this regard, the port is not deactivated if the port that sent the loop detection frame is the detection sending port. On the loop detection, the trap display due to the loop occurrence is applied to the control terminal device (503). The loop detection frame is not transferred to the other switch apparatus even though the uplink port receives the loop detection frame sent from the switch apparatus itself (504). In addition, the loop detection frame is transferred (or flooded) when the uplink port receives the loop detection frame sent by the other switch apparatus.

An operation of the uplink port will be described with reference to FIGS. 4, 6, 14 and 15.

It is assumed that the port 415 in the L2 switch apparatus 401 in FIG. 4 is set in the port information table 1400 with a port identification of "uplink port." In this case, the loop detection frame is not sent even though the loop detection function is effective at the port 415.

On the contrary, when the port 415 of the uplink port receives the loop detection frame, the frame sending/receiving processor 410 judges whether the DMAC 601 of the loop detection frame is the same as the original MAC address and the SMAC 602 is the same as the MAC address of the switch apparatus itself. If it is judged that the both addresses are the same, the received loop detection frame and reception port information are sent to the L2 control frame sorting controller 409. If it is judged that the SMAC 602 is not the same as the MAC address of the switch apparatus itself, the flooding process is carried out for the loop detection frame received by the transfer control processor 411. The L2 control frame sorting controller 409 then confirms the DMAC 601 in the reception frame. The reception frame and reception port information are sent to the L2 loop detection frame sending/receiving controller 407 in the L2 loop detection processor 402, when it is confirmed that the original MAC address of DMAC 601 is the MAC address of the loop detection frame. The L2 loop detection frame sending/receiving controller 407 then confirms the version 605 and message class 606 in the user data of the reception frame. If the L2 loop detection frame sending/receiving controller 407 judges the loop detection frame, the reception frame and reception port information are sent to the loop detection controller 405.

The loop detection controller 405 refers to the reception port information received from the L2 loop detection frame sending/receiving controller 407 to confirm that the port 415 receives the loop detection frame. The loop detection controller 405 also refers to the loop detection port identification 1402 in the record corresponding to the port number (port 1) of port 415 from the port information table 1400 in the port information/control information management table controller 406 to confirm that the port 415 that received the loop detection frame is the uplink port (U). If the port identification of the port that received the loop detection frame is the uplink port, the loop detection controller 405 carries out the following operation.

The loop detection controller 405 acquires a port number 608, 617 (for example, port 2, port 3, etc.) from the user data in the loop detection frame in order to specify a sending source port number of the loop detection frame received from the L2 loop detection frame sending/receiving controller 407. The loop detection controller 405 refers to the record corresponding to the sending source port number 608, 617 in the control information table 1500 on the basis of the acquired sending source port number 608, 617, and if the hold timer 1504 does not exceed the hold time period 1406 corresponding to the sending source port number 608, 617 in the port information table 1400, the number of times of detection 1503 corresponding to the sending source port number 608, 617 in the control information table 1500 is incremented by "1." If the hold timer 1504 exceeds the hold time period 1406, the number of detection times 1503 is set to "0" and incremented by "1." It is judged that a loop failure has occurred if the number of detection times 1503, after incremented, is come to the number of detection times 1405 indicative of the inactivation threshold value corresponding to the sending source port number 608, 617 in the port information table 1400. In this case, the loop detection controller 405 refers to the loop detection port identification 1402 in the port information table 1400 on the basis of the sending source port number 608, 617 to confirm whether the sending source port is S (detection sending port) or SI (detection sending inactivation port). The sending source port is deactivated if this port is the detection sending inactivation port. However, the sending source port is not deactivated if this port is the detection sending port. This inactivation process is that the sending source port number and port inactivation command are sent to the loop detection port controller 408 from the loop detection controller 405. The loop detection port controller 408 sends the sending source port number and port inactivation command to the apparatus port controller 412. The apparatus port controller 412 deactivates the port commanded from the loop detection port controller 408. Further, the loop detection controller 405 sets the port up/down information 1502 corresponding to the sending source port number 608, 617 in the control information table 1500 to U (port down), and also sets the elapsed time, after inactivating the port, in the automatic recovered timer 1505.

In the above-mentioned case, both the count for the number of detection times and comparison with the threshold value have been carried out for the sending source port, when the uplink port receives the loop detection frame. However, it may be judged whether the loop failure has occurred in such a way that the number of detection times for the uplink port is counted and compared with an independent threshold value of the uplink port.

In this embodiment as described above, there have been three types of port identification: the detection sending inactivation port (SI), detection sending port (S), and uplink port (U). However, the number of port identification may be increased by changing the combination of whether the loop detection frame is sent, whether the port is deactivated on the loop detection, and whether the display is carried out on the loop detection.

Figure 7:
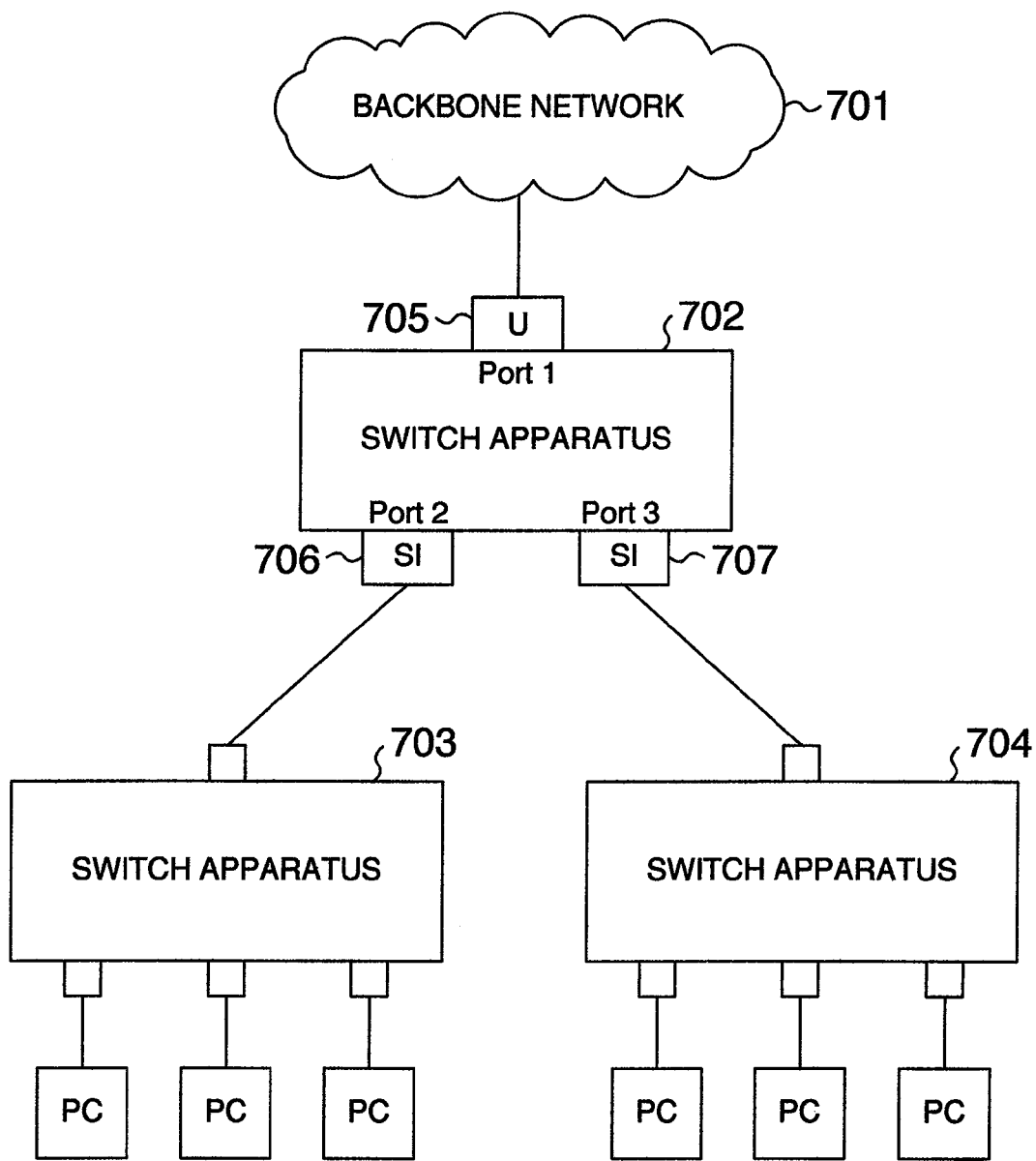
FIG. 7 is a diagram showing a loop detection operation in the switch apparatus mounting with the loop detection function in the embodiment.

FIG. 7 shows a loop detection operation performed by the switch apparatuses mounting with the loop detection function in this embodiment.

A switch apparatus 702 has the loop detection function mounting therewith, and switch apparatuses 703 and 704 have not the loop detection function. The switch apparatus 702 sets a port 1 (705) connected with a backbone network 701 to a high-order port, sets a port 2 (706) and a port 3 (707) both connected respectively with the switch apparatuses 703, 704, including PCs, arranged below the switch apparatus 702 to low-order ports, and carries out the loop detection on a network arranged below the switch apparatus 702.

After activating the loop detection function in the switch apparatus 702, this switch apparatus 702 sets a port identification of the port 1 (705) connected with the backbone network 701 to the uplink port (U), and sets port identifications of the port 2 (706) and port 3 (707) connected with the low-order network to the detection sending inactivation port (SI).

In this constitution described above, the low-order ports 706, 707 (detection sending inactivation port) in the switch apparatus 702 send the loop detection frame at intervals of the predetermined frame sending time interval 1404. The loop detection frame that has been sent is transferred again to the switch apparatus 702 when a loop failure is being occurred on the network arranged below the switch apparatus 702. Since the low-order ports 706, 707 then receive the loop detection frame, both ports 706, 707 are deactivated as the detection sending inactivation port. Further, when the loop detection frame sent from the low-order port 706 is received by the uplink port 705 via the other switch apparatus (not shown), the low-order port 706 as a sending source port is deactivated since the reception port is the uplink port. In this way, since the uplink port 705 as a reception port of the loop detection frame is not deactivated, and the low-order port 706 as a sending port is deactivated, the switch apparatus 704, including PCs, connected with the low-order port 707 is not decoupled from the network, so that the switch apparatus 704 can be communicated continuously with the backbone network 701.

With the process carried out as described above, it is possible to decouple a failure caused by the loop occurrence from the network and not to spread an adverse effect of the loop failure on the entire network. Further, since the high-order port 705 (uplink port) does not send the loop detection frame, redundant traffic is not generated on the backbone network 701.

Figure 8:
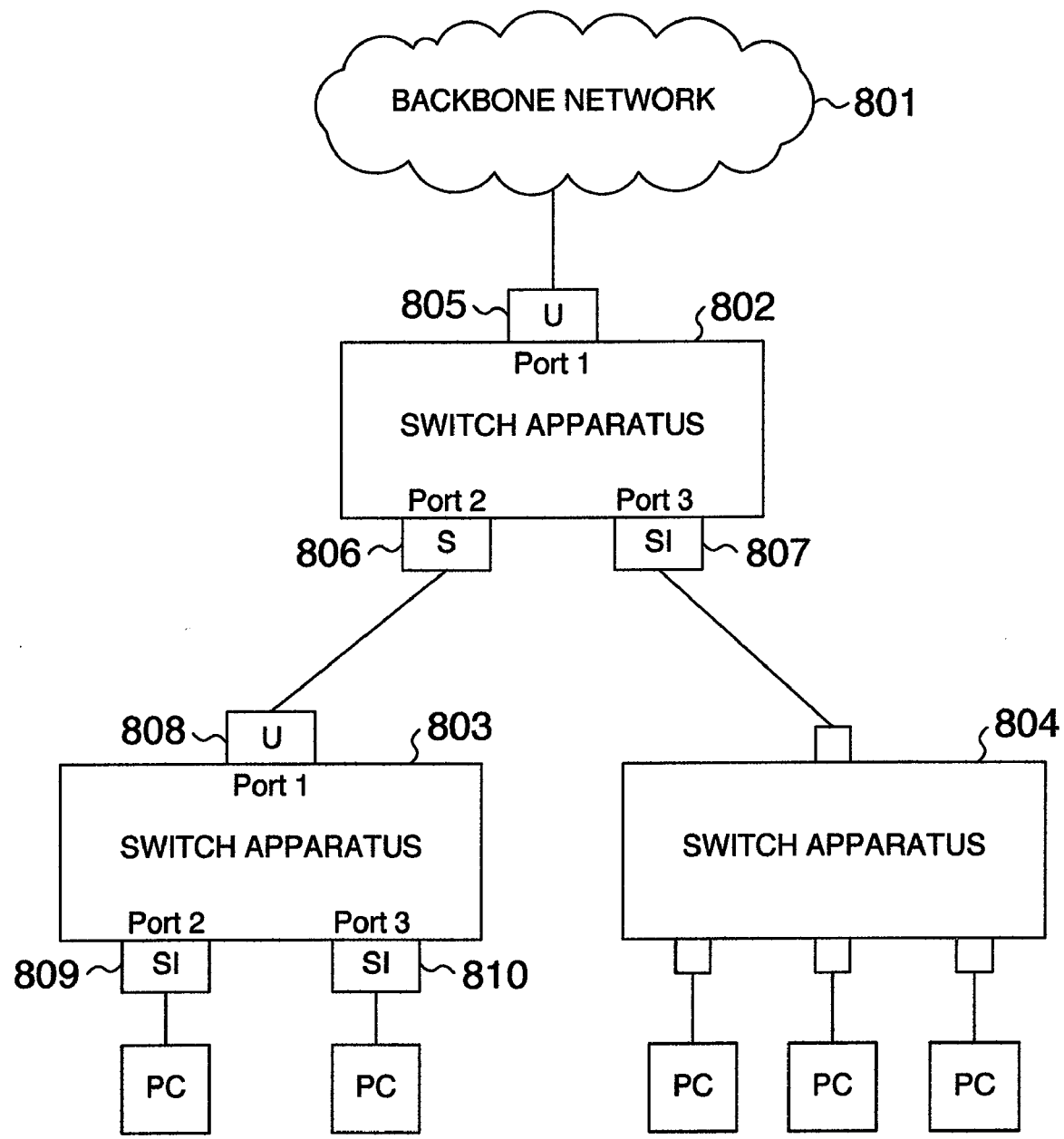
FIG. 8 is a diagram showing the loop detection operation in the case of installing the plural switch apparatuses mounting with the loop detection function in the embodiment.

FIG. 8 shows a loop detection operation in the case of installing a plurality of switch apparatuses mounting with the loop detection function in this embodiment.

Switch apparatuses 802 and 803 have the loop detection function mounting therewith, and a switch apparatus 804 does not have the loop detection function. The switch apparatus 802 sets a port 1 (805) connected with a backbone network 801 to a high-order port, sets a port 2 (806) and a port 3 (807) both connected respectively with the switch apparatuses 803, 804 arranged below the switch apparatus 802 to low-order ports, and carries out the loop detection on a network arranged below the switch apparatus 802. The switch apparatus 803 sets a port 1 (808) connected with the switch apparatus 802 to a high-order port, sets a port 2 (809) and a port 3 (810) both connected respectively with PCs arranged below the switch apparatus 803 to low-order ports, and carries out the loop detection on a network arranged below the switch apparatus 803.

Since the switch apparatuses 802 and 803 have the loop detection function mounting therewith, the switch apparatus 802 as a high-order apparatus only carries out a trap of the loop failure, but does not deactivate the port, when the both switch apparatuses 802, 803 detect a loop failure. However, the port in the switch apparatus 803, as a low-order apparatus, close to the loop failure is deactivated, so that the loop occurrence can be suppressed. For this reason, the loop detection frame can be come continuously through the port regardless of the loop failure.

In this constitution described above, after activating the loop detection function in the switch apparatus 802, this switch apparatus 802 sets the port identification of the port 1 (805) connected with the backbone network 801 to the uplink port (U), and sets the port identification of the port 2 (806) connected with the switch apparatus 803 mounting with the loop detection function to the detection sending port (S). Since the port 2 (806) is the detection sending port, the loop detection frame is sent at intervals of the predetermined frame sending time interval 1404. Further, when the loop detection frame sent from the switch apparatus 802 is received by the port 2 (806) to thereby detect a loop failure, the port is not deactivated since this port is the detection sending port, but a handling of the loop failure is carried out by the switch apparatus 803 close to an occurrence place of the loop failure. The switch apparatus 802 only carries out a display to annunciate that the loop failure has occurred.

On the contrary, the port identification of the port 3 (807) in the switch apparatus 802 is set to the detection sending inactivation port (SI). Since the port 3 (807) is the detection sending inactivation port, the loop detection frame is sent at intervals of the predetermined frame sending time interval 1404. When the loop detection frame sent from the switch apparatus 802 is received by the port 3 (807), the port 3 (807) is deactivated since this reception port is the detection sending inactivation port. The loop failure occurred under the port 3 (807) is then decoupled.

Further, when the loop detection frame sent from the switch apparatus 802 is received by the uplink port of the port 1 (805) via the other switch apparatus (not shown), a sending source port is deactivated since the reception port is the uplink port. However, when the sending source port is the detection sending port of the port 2 (806), the handling of the loop failure is carried out by the switch apparatus 803 close to the occurrence place of the loop failure. For this reason, the switch apparatus 802 only carries out a display to annunciate that the loop failure occurs, and the port 2 (806) as the sending source port connected with the switch apparatus 803 is not deactivated. In this way, it is possible to decouple the port close to the occurrence place of the loop failure from the network and not to spread an adverse effect of the loop failure to the entire network. In addition, the sending source port is deactivated when the sending source port is the detection sending inactivation port 3 (807).

After activating the loop detection function in the switch apparatus 803, this switch apparatus 803 sets the port identification of the high-order port 1 (808) connected with the switch apparatus 802 to the uplink port (U), and sets the port identifications of the port 2 (809) and port 3 (810), as low-order ports, of the switch apparatus 803, to the detection sending inactivation port (SI). In this way, when the loop detection frame sent from the switch apparatus 803 is received by the low-order port, the reception port is deactivated. When the loop detection frame is received by the uplink port, the sending source port is deactivated. Therefore, it is possible to decouple a loop failure from the network and not spread an adverse effect of the loop failure to the entire network.

Figure 9:
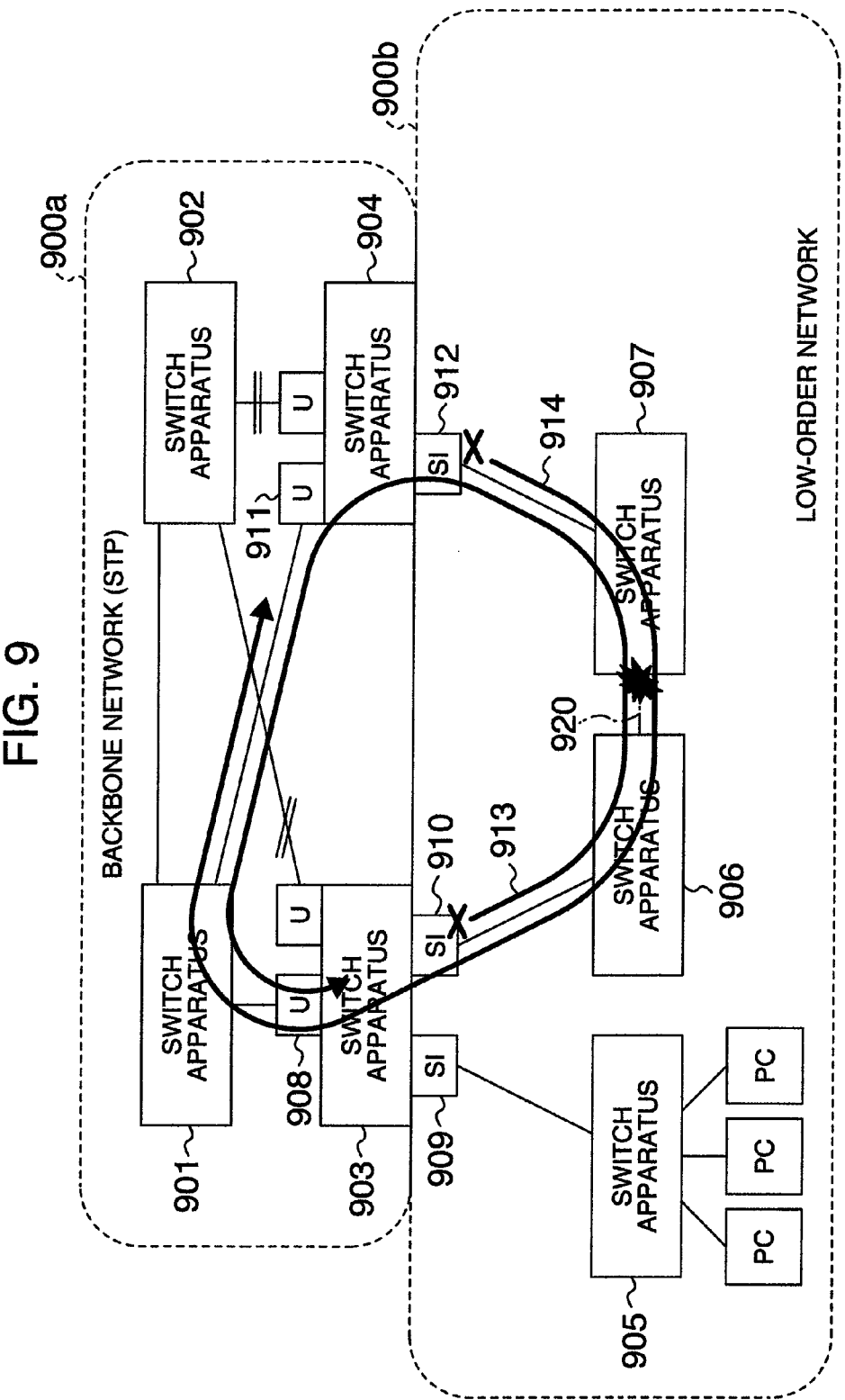
FIG. 9 is a diagram showing a port inactivation operation in a first network constitution on the loop detection.

FIG. 9 shows an operation of the port inactivation in a first network constitution on the loop detection. FIG. 9 also shows that the STP activates in a switch apparatus 901, switch apparatus 902, switch apparatus 903 and switch apparatus 904, these arranged in a backbone network 900*a*, to thereby carry out loop suppression.

The switch apparatuses 903 and 904 have the loop detection function of the present invention, and switch apparatuses 905, 906 and 907 arranged on a low-order network 900*b* do not have the loop detection function of the invention.

The switch apparatus 903 sets a port 908 connected with the backbone network 900*a* to a high-order port, and sets respectively ports 909, 910 connected with the switch apparatus 905 arranged below the switch apparatus 903 to low-order ports, by which the loop detection is carried out on a network arranged below the switch apparatus 903. The switch apparatus 903 is a high-order apparatus of the switch apparatuses 905, 906.

The switch apparatus 904 sets a port 911 connected with the backbone network 900*a* to a high-order port, and sets a port 912 connected through the switch apparatus 907 arranged below the switch apparatus 904 to a low-order port, by which the loop detection is carried out on a network arranged below the switch apparatus 904. The switch apparatus 904 is a high-order apparatus of the switch apparatus 907.

After activating the loop detection function in the switch apparatus 903, this switch apparatus 903 sets the port identification of the port 908 connected with the backbone network 900*a* to the uplink port (U), and sets the port identifications of the ports 909, 910, as the low-order port, to the detection sending inactivation port (SI). The low-order ports 909, 910 (detection sending inactivation port) send the loop detection frame at intervals of the predetermined frame sending time interval 1404. When the loop detection frame sent from the switch apparatus 903 is received by the low-order ports 909, 910, those reception ports are deactivated, and when it is received by the uplink port 908, the sending source port is deactivated.

After activating the loop detection function even in the switch apparatus 904, this switch apparatus 904 sets the port identification of the port 911 connected with the backbone network 900*a* to the uplink port (U), and sets the port identification of the low-order port 912 to the detection sending inactivation port (SI). The low-order port 912 (detection sending inactivation port) sends the loop detection frame at intervals of the predetermined frame sending time interval 1404. When the loop detection frame sent from the switch apparatus 904 is received by the low-order port 912, this reception port is deactivated, and when it is received by the uplink port 911, the sending source port is deactivated.

FIG. 9 illustrates a case where a loop failure occurs by causing an improper connection 920 between the switch apparatuses 906 and 907 arranged on the low-order network 900*b*. Since the switch apparatus 903 judges that a loop failure has occurred by causing that a loop detection frame 913 sent from the low-order port 910 is received by the uplink port 908, the sending source port 910 is deactivated. It is possible to continuously communicate the switch apparatus 905 arranged below the other low-order port 909 with the backbone network 900*a*, since the uplink port 908 that received the loop detection frame is not deactivated, but the sending source port 910 is deactivated. Further, in the switch apparatus 904, it is judged that a loop failure has occurred by causing that a loop detection frame 914 sent from the low-order port 912 is received by the uplink port 911. Because of this, it is possible to decouple the loop failure from the network by inactivating the sending source port 912, and not to spread an adverse effect of the loop failure on the entire network.

Figure 10:
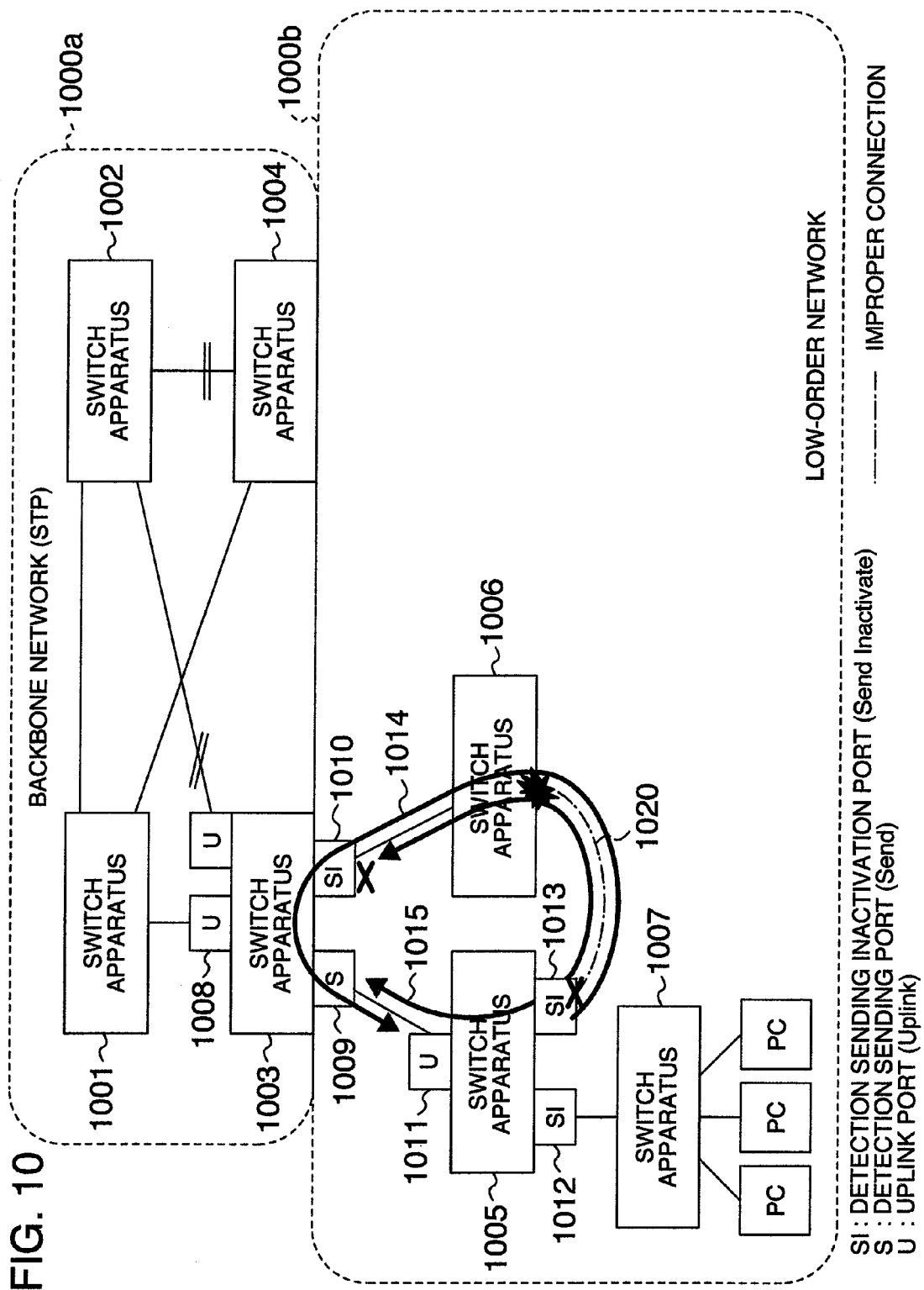
FIG. 10 is a diagram showing the port inactivation operation in a second network constitution on the loop detection.

FIG. 10 shows an operation of the port inactivation in a second network constitution on the loop detection. FIG. 10 also shows that the STP activates in a switch apparatus 1001, switch apparatus 1002, switch apparatus 1003 and switch apparatus 1004, these arranged on a backbone network 1000*a* to thereby carry out the loop suppression.

The switch apparatus 1003 has the loop detection function of the invention, and a switch apparatus 1005 arranged on a low-order network 1000*b* also has the loop detection function of the invention. Switch apparatuses 1006 and 1007 arranged on the low-order network 1000*b* do not have the loop detection function of the invention.

The switch apparatus 1003 sets a port 1008 connected with the backbone network 1000*a* to a high-order port, and sets ports 1009, 1010 connected respectively with switch apparatuses 1005, 1006 arranged below the switch apparatus 1003 to low-order ports, by which the loop detection is carried out on a network arranged below the switch apparatus 1003. The switch apparatus 1003 is a high-order apparatus of the switch apparatuses 1005 and 1006. The switch apparatus 1005 sets a port 1011 connected with the switch apparatus 1003 to a high-order port, and sets respectively ports 1012, 1013 connected with the switch apparatus 1007, including PCs, arranged below the switch apparatus 1005 to low-order ports, by which the loop detection on a network arranged below the switch apparatus 1005 is carried out.

Since the switch apparatuses 1003 and 1005 have the loop detection function, the high-order switch apparatus 1003 carries out only the trap of the loop failure, and does not deactivate the port. However, the port in the low-order switch apparatus 1005 close to an occurrence place of the loop failure is deactivated, so that the loop occurrence can be suppressed. For this reason, the loop detection frame can be come continuously through the port regardless of the loop failure.

After activating the loop detection function in the switch apparatus 1003, this switch apparatus 1003 sets the port identification of the port 1008 connected with the backbone network 1000a to the uplink port (U), and sets the port identification of the port 1009 connected with the low-order switch apparatus 1005 mounting with the loop detection function to the detection sending port (S). The loop detection frame is sent at intervals of the predetermined frame sending time interval 1404 since the port 1009 is the detection sending port. Further, when the loop detection frame sent from the switch apparatus 1003 is received by the port 1009 to then detect a loop failure, the port 1009 is not deactivated since this port is the detection sending port, and the handling of the loop failure is carried out by the switch apparatus 1005 close to the occurrence place of the loop failure. The switch apparatus 1003 only carries out a display to annunciate that the loop failure occurs.

On the contrary, the port identification of the port 1010 in the switch apparatus 1003 is set to the detection sending inactivation port (SI). The loop detection frame is sent at intervals of the predetermined frame sending time interval 1404 since the port 1010 is the detection sending inactivation port. When the loop detection frame sent from the switch apparatus 1003 is received by the port 1010, this port is deactivated since the port 1010 is the detection sending inactivation port, so that the loop failure occurred under the port 1010 is decoupled.

Further, when the loop detection frame sent from the switch apparatus 1003 is received by the uplink port of the port 1008 via the other switch apparatus (not shown), a sending source port is deactivated since the reception port is the uplink port. However, when the sending source port is the detection sending port of the port 1009, the switch apparatus 1003 only carries out a display to annunciate that the loop failure occurs, since the handling of the loop failure is carried out in the switch apparatus 1005 close to the occurrence place of the loop failure. The switch apparatus 1003 does not deactivate the port 1009 connected with the switch apparatus 1005 as a sending source port. In this way, it is possible to decouple the port close to the occurrence place of the loop failure from the network and not to spread an adverse effect of the loop failure on the entire network. In addition, the sending source port is deactivated when the sending source port is the detection sending inactivation port 1009.

After activating the loop detection function in the switch apparatus 1005, this switch apparatus 1005 sets the port identification of the high-order port 1011 connected with the switch apparatus 1003 to the uplink port (U), and sets the port identifications of the ports 1012 and 1013 as low-order ports of the switch apparatus 1005 to the detection sending inactivation port (SI). In this way, when the loop detection frame sent from the switch apparatus 1005 is received by the low-order port, this reception port is deactivated, and when it is received by the uplink port, the sending source port is deactivated. Because of this, it is possible to decouple the loop failure from the network and not spread an adverse effect of the loop failure on the entire network.

FIG. 10 illustrates a case where a loop failure occurs caused by an improper connection 1020 between the switch apparatuses 1005 and 1006 arranged on the low-order network 1000b. In the switch apparatus 1003, the detection sending port 1009 and the detection sending inactivation port 1010 mutually receive a loop detection frame 1015 sent from low-order ports to thereby judge that a loop failure has occurred at the both ports. In this case, the detection sending port 1009 is not deactivated, but the detection sending inactivation port 1013 is deactivated. In the switch apparatus 1005, the sending source port 1013 is deactivated since it is judged that the loop failure has occurred by receiving a loop detection frame 1014 sent from the low-order port 1013 by the uplink port 1011. The uplink port 1011 that received the loop detection frame is not deactivated, but the sending source port 1013 is deactivated, therefore, it is possible that the switch apparatus 1007, including PCs, arranged below the other low-order port 1012 communicates continuously with the backbone network 1000a. It is also possible not to spread an adverse effect of the loop failure on the entire network, since the loop failure is decoupled from the network.

FIG. 10 also illustrates a case where a loop failure occurs on a network arranged below the low-order port 1012 of the switch apparatus 1005. This is a similar case where the loop failure 112 occurs in FIG. 1. In this case, the loop detection frame sent from the low-order port 1009 in the switch apparatus 1003 is transferred from the port 1012 via the switch apparatus 1005, received again by the port 1012 since the loop failure has been occurred, and finally received by the low-order port 1009 in the switch apparatus 1003. In this way, the switch apparatus 1003 judges that the loop failure has occurred, however, the port 1009 is not deactivated since the port that received the loop detection frame is the detection sending port. On the contrary, the loop detection frame sent from the low-order port 1012 in the switch apparatus 1005 is received again by the port 1012 since the loop failure has occurred. In this case, the switch apparatus 1005 judges that the loop failure has occurred, and inactivates the port 1012 that received the loop detection frame, since the port 1012 is the detection sending inactivation port, to then decouple the network arranged below the port 1012 where the loop failure has occurred. In this way, it is possible that the network connected with the port other than the port 1012 in the switch apparatus 1005 is communicated continuously with the backbone network 1000a even though the loop failure has occurred, since the port 1012 close to the occurrence place of the loop failure can be deactivated. In addition, the similar port inactivation operation is also carried out in the case where the loop detection frames sent from the low-order port 1009 in the switch apparatus 1003 and the low-order port 1012 in the switch apparatus 1005 are received respectively by the uplink port 1008 in the switch apparatus 1003 and the uplink port 1011 in the switch apparatus 1005.

As described the above embodiment, it is possible to select the port identification to be set to each port of the switch apparatuses from the plural types (detection sending inactivation port, detection sending port, and uplink port) in accordance with the network constitution. Because of this, it is possible to flexibly handle the loop failure to be occurred on the various network constitutions, and to keep an adverse effect caused by the loop failure to a minimum on the network.

FIG. 11 is a diagram showing operation contents in response to the port identifications of the respective ports to be connected, when the switch apparatuses each mounting with the loop detection function are connected with each other in the embodiment.

FIG. 11 shows port conditions on detecting the occurrence of the loop failure, when the detection sending inactivation port, detection sending port and uplink port are mutually connected to ports of a connection device A and a connection device B.

(1) The port identification of the connection device A is connected with the detection sending inactivation port, and the port identification of the connection device B is connected with the detection sending inactivation port. Because of this constitution, when the loop failure is detected by the respective ports, the port of the connection device A is deactivated, and the port of the connection device B is also deactivated.

(2) The port identification of the connection device A is connected with the detection sending inactivation port, and the port identification of the connection device B is connected with the detection sending port. Because of this constitution, when the loop failure is detected by the respective ports, the port of the connection device A is deactivated, and the port of the connection device B only detects the loop failure, but is not deactivated.

(3) The port identification of the connection device A is connected with the detection sending inactivation port, and the port identification of the connection device B is connected with the uplink port. Because of this constitution, when the loop failure is detected by the respective ports, the port of the connection device A is deactivated, the port of the connection device B only detects the loop failure, the port of the uplink port is not deactivated, and the sending source port that sent the loop detection frame by the connection device B is deactivated. In this regard, the sending source port is not deactivated when this port is the detection sending port.

(4) The port identification of the connection device A is connected with the detection sending port, and the port identification of the connection device B is connected with the detection sending inactivation port. Because of this constitution, when the loop failure is detected by the respective ports, the port of the connection device A is not deactivated, but the port of the connection device B is deactivated.

(5) The port identification of the connection device A is connected with the detection sending port, and the port identification of the connection device B is also connected with the detection sending port. Because of this constitution, when the loop failure is detected by the respective ports, the L2 control frame can only be passed, but a communication for an ordinary data frame is restricted to thereby turn into a non-connection condition since a port block condition is arisen by a confirmation operation of the port identification at the connection destination of loop detection. In this case, it is judged that the connectivity of loop detection port is ineffective, therefore, the loop detection frame is not sent by either the detection sending port. The confirmation operation of the port identification at the connection destination of loop detection will be described later with reference to FIGS. 12 and 13.

(6) The port identification of the connection device A is connected with the detection sending port, and the port identification of the connection device B is connected with the uplink port. Because of this constitution, when the loop failure is detected by the respective ports, the port of the connection device A is not deactivated, the port of the connection device B only detects the loop failure, the uplink port is not deactivated, and the sending source port that has sent the loop detection frame by the connection device B is deactivated. In this regard, the sending source port is not deactivated when this port is the detection sending port.

(7) The port identification of the connection device A is connected with the uplink port, and the port identification of the connection device B is connected with the detection sending inactivation port. Because of this constitution, when the loop failure is detected by the respective ports, the port of the connection device A only detects the loop failure, the port of the uplink port is not deactivated, but the sending source port that sent the loop detection frame by the connection device A is deactivated. In this regard, the sending source port is not deactivated when this port is the detection sending port. The port of the connection device B is deactivated.

(8) The port identification of the connection device A is connected with the uplink port, and the port identification of the connection device B is connected with the detection sending inactivation port. Because of this constitution, when the loop failure is detected by the respective ports, the port of the connection device A only detects the loop failure, the uplink port is not deactivated, and the sending source port that has sent the loop detection frame by the connection device A is deactivated. In this regard, the sending source port is not deactivated when this port is the detection sending port. The port of the connection device B is not deactivated.

(9) The port identification of the connection device A is connected with the uplink port, and the port identification of the connection device B is also connected with the uplink port. Because of this constitution, when the loop failure is detected by the respective ports, the port of the connection device A only detects the loop failure, and the uplink port is not deactivated, and the sending source port that sent the loop detection frame by the connection device A is deactivated. In this regard, the sending source port is not deactivated when this port is the detection sending port. Further, the port of the connection device B also only detects the loop failure, and the uplink port is not deactivated, and the sending source port that sent the loop detection frame by the connection device B is deactivated. In this regard, the sending source port is not deactivated when this port is the detection sending port.

Next, the following description will be concerned with an improper connection suppressing process caused by an improper setting of the port identification relative to the loop detection of the detection sending inactivation port, detection sending port and the uplink port, and a case of connecting an adjacent device to an improper loop detection port.

In the improper connection suppressing process, a frame (hereinafter, referred to as "loop detection/connection/port identification confirming frame") used for confirming the port identification to be connected with a loop detection which stores sending source port information, is sent to the adjacent device from the switch apparatus itself, and a predetermined time period is given until the loop detection/connection/port identification confirming frame is sent from the adjacent device, for a purpose of confirming whether the connectivity with the port of adjacent device to be connected is effective and controlling the port, when the port identification is set to the port which activates the loop detection function in the loop detection of the detection sending inactivation port, detection sending port and uplink port in the loop detection. When the loop detection/connection/port identification confirming frame is received from the adjacent device for the predetermined time period, the port identification of the reception port in the loop detection is confirmed, and the port identification of the connection port with the adjacent device in the loop detection is also confirmed, so that it is confirmed whether the connectivity is effective.

The operation of loop detection and the sending of loop detection frame are started if the connectivity is effective with the adjacent device, and the port condition is blocked if the connectivity is ineffective. As for the connectivity with the adjacent device, it is judged that the connectivity is ineffective in the only case (5), and effective in the other cases except for the case (5).

In addition, the connectivity confirmation does not always have to carry out in this case. The operation of loop detection and the sending of the loop detection frame may be started immediately after activating the loop detection function.

Figure 12:
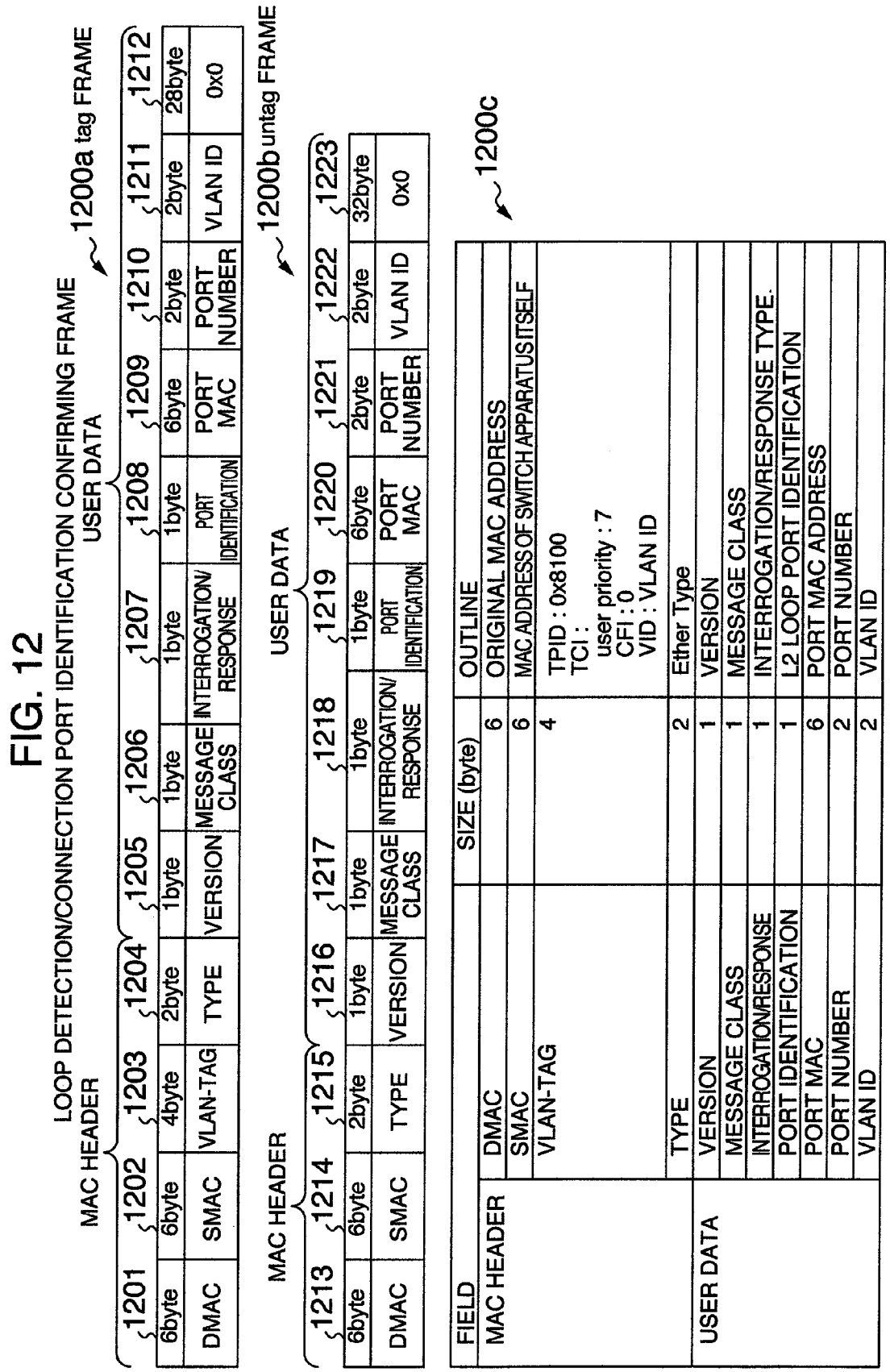
FIG. 12 is an explanatory diagram showing a format of a loop detection/connection/port identification confirming frame in the embodiment.

FIG. 12 shows a format of the loop detection/connection/port identification confirming frame. This frame may be used of either a tag frame 1200*a* or an untag frame 1200*b*. The tag frame 1200*a* is made up of adding a VLAN TAG field 1203 to the untag frame 1200*b*. The contents in the respective fields of the loop detection/connection/port identification confirming frame are shown in a table 1200*c*. The loop detection/connection/port identification confirming frame uses the L2 control frame. A destination MAC address 1201, 1213 of an MAC header uses a previously reserved original MAC address. A sending source MAC address 1202, 1214 of the MAC header uses the MAC address of the switch apparatus itself. A type 1204, 1215 indicates the type of frame. Further, the user data contains a version 1205, 1216 of the loop detection/connection/port identification confirming frame, a message class 1206, 1217 indicative of a class etc. indicating whether the frame is the loop detection frame or the loop detection/connection/port identification confirming frame, identification information 1207, 1218 of interrogation or response of port information, a port identification 1208, 1219 indicating a port identification set in the sending source port, a port MAC 1209, 1220 indicating the MAC address of the sending source port, a sending source port number 1210, 1221, and a VLAN ID 1211, 1222. A port identification judging process can be carried out for the port that has activated the loop detection function, even though the loop detection/connection/port identification confirming frame is received by the port, of which the portion condition is blocked. The rest of frame 1212, 1223 is padded with null (0x00).

Figure 13:
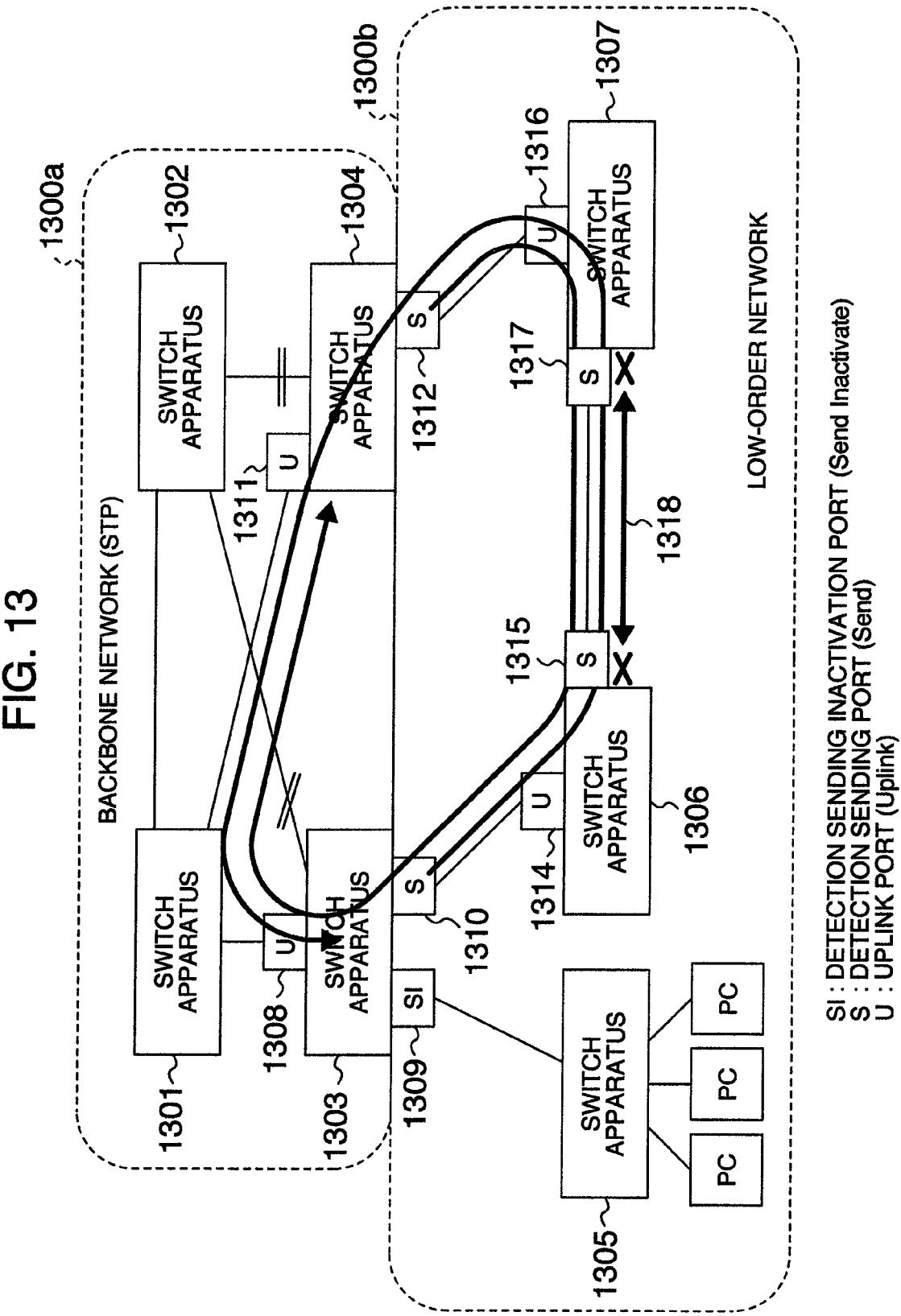
FIG. 13 is a network constitution diagram for explaining an improper connection suppressing process using the loop detection/connection/port identification confirming frame in the embodiment.

FIG. 13 is a diagram showing a network constitution for explaining the improper connection suppressing process using the loop detection/connection/port identification confirming frame.

FIG. 13 illustrates that the loop suppression is carried out by activating STP in a switch apparatus 1301, a switch apparatus 1302, a switch apparatus 1303, and a switch apparatus 1304, these arranged on a backbone network 1300*a*.

The switch apparatuses 1303, 1304 have the loop detection function of the invention. A switch apparatus 1305 arranged on a low-order network 1300*b* does not have the loop detection function. Switch apparatuses 1306 and 1307 have the loop detection function.

The switch apparatus 1303 sets a port 1308 connected to the backbone network 1300*a* to a high-order port, and sets ports 1309, 1310 connected with switch apparatuses 1305 and 1306, including PCs, arranged below the switch apparatus 1303 to low-order ports, by which the loop detection is carried out on a network arranged below the switch apparatus 1303. The switch apparatus 1303 is a high-order apparatus of the switch apparatuses 1305, 1306.

The switch apparatuses 1304 sets a port 1311 connected to the backbone network 1300*a* to a high-order port, and sets a port 1312 connected with a switch apparatus 1307 arranged below the switch apparatus 1304 to a low-order port, by which the loop detection is carried out on a network arranged below the switch apparatus 1304. The switch apparatus 1304 is a high-order apparatus of the switch apparatus 1307.

After activating the loop detection function in the switch apparatus 1303, this switch apparatus 1303 sets the port identification of the port 1308 connected to the backbone network 1300*a* to the uplink port (U).

The switch apparatus 1303 sets the port identification of the low-order port 1309 to the detection sending inactivation port (SI). The loop detection frame is sent at intervals of the predetermined frame sending time interval 1404 since the port 1309 is the detection sending inactivation port. When the loop detection frame sent from the switch apparatus 1303 is received by the low-order port 1309, the reception port is deactivated. When the frame is received by the uplink port 1308, the sending source port is deactivated.

Further, the port identification of the low-order port 1310 connected with the low-order switch apparatus 1306 mounting with the loop detection function is set to the detection sending port (S). Because of this, when the loop failure is detected at the port 1310, the handling of the loop failure is carried out in the switch apparatus 1306 close to an occurrence place of the loop failure. The switch apparatus 1303 only carries out a display to annunciate that the loop failure has occurred, and the port 1310 connected with the switch apparatus 1306 is not deactivated.

After activating the loop detection function even in the switch apparatus 1304, this switch apparatus 1304 sets the port identification of the port 1311 connected to the backbone network 1300*a* to the uplink port (U), and sets the port identification of the low-order port 1312 connected with the low-order switch apparatus 1307 mounting with the loop detection function to the detection sending port (S). Further, when the port 1312 detects the loop failure, the handling of the loop failure is carried out in the switch apparatus 1307 close to the occurrence place of the loop failure. The switch apparatus 1304 carries out a display to annunciate that the loop failure has occurred, and the port 1312 connected with the switch apparatus 1307 is not deactivated.

The switch apparatus 1306 sets the port identification of a port 1314 connected with the switch apparatus 1303 to the uplink port (U), and sets the port identification of a port 1315 to the detection sending port (S). The switch apparatus 1307 sets the port identification of a port 1316 connected with the switch apparatus 1304 to the uplink port (U), and sets the port identification of a port 1317 in the switch apparatus 1307 to the detection sending port (S).

At this time, the loop detection/connection/port identification confirming frame 1318 which stores the sending source port information (including port identification) is sent to the adjacent device from the switch apparatus itself, and the predetermined time period is given until the loop detection/connection/port identification confirming frame is sent from the adjacent device, for a purpose of confirming whether the connectivity with the port of the adjacent device to be connected is effective and of controlling the port, when the port identification is set to the port which activates the loop detection function in the loop detection of the detection sending inactivation port, detection sending port and uplink port. When the loop detection/connection/port identification confirming frame is received from the adjacent device for the predetermined time period, the port identification of the reception port in the loop detection is confirmed, and the port identification 1208, 1219 of the connection port with the adjacent device in the loop detection is also confirmed, so that it is confirmed whether the connectivity is effective.

The operation of loop detection is carried out if the connectivity is effective with the adjacent device, and the port condition is blocked if the connectivity is ineffective. In FIG. 13, it is judged that the connectivity is ineffective and pertinent to the case (5) in FIG. 11 since the port 1315 in the switch apparatus 1306 and the port 1317 in the switch apparatus 1307 are mutually connected with the detection sending port (S), so that the port condition is turned into a blocking condition. If it is judged that the improper connection suppressing process is not carried or the connectivity of the mutually connected detection sending ports (S) is effective, an adverse effect of the loop failure is continuously spread on the entire network since the ports relative to the occurrence of loop failure are not deactivated in any switch apparatuses when the loop detection is carried out by the detection sending port (S). For this reason, the improper connection suppressing process is carried out, and the port condition for the port 1315 in the switch apparatus 1306 and the port 1317 in the switch apparatus 1307, as the detection sending port (S), are blocked, so that the loop failure is previously avoidable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system including a first switch apparatus and a second switch apparatus, wherein
the first switch apparatus includes:
   a first port that is connected to the second switch apparatus and sends a first loop detection frame to detect an occurrence of a loop failure;
   a second port that receives the first loop detection frame; and
   a first controller that controls the first and second ports of the first switch apparatus,
the second switch apparatus includes:
   a third port that sends a second loop detection frame to detect an occurrence of a loop failure;
   a fourth port that is connected to the first port of the first switch apparatus and receives the second loop detection frame; and
   a second controller that controls the third and fourth ports of the second switch apparatus,
wherein the second controller detects at the fourth port an occurrence of a loop failure by receiving the second loop detection frame sent from the third port and deactivates the third port which has sent the second loop detection frame when the occurrence of the loop failure has been determined, and
wherein the first controller detects at the second port an occurrence of a loop failure by receiving the first loop detection frame sent from the first port but does not deactivate the first port that has sent the first loop detection frame when the occurrence of the loop failure has been determined.

* * * * *